US012597243B2

(12) United States Patent
Beye et al.

(10) Patent No.: US 12,597,243 B2
(45) Date of Patent: Apr. 7, 2026

(54) INFORMATION PROCESSING SYSTEM, INFORMATION PROCESSING DEVICE, INFORMATION PROCESSING METHOD, AND STORAGE MEDIUM

(71) Applicant: NEC Corporation, Tokyo (JP)

(72) Inventors: Florian Beye, Tokyo (JP); Yusuke Shinohara, Tokyo (JP); Hayato Itsumi, Tokyo (JP); Charvi Vitthal, Tokyo (JP); Koichi Nihei, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 18/280,381

(22) PCT Filed: Mar. 9, 2021

(86) PCT No.: PCT/JP2021/009250
§ 371 (c)(1),
(2) Date: Sep. 5, 2023

(87) PCT Pub. No.: WO2022/190203
PCT Pub. Date: Sep. 15, 2022

(65) Prior Publication Data
US 2024/0153260 A1      May 9, 2024

(51) Int. Cl.
*G06V 10/82* (2022.01)
*G06V 10/776* (2022.01)
(52) U.S. Cl.
CPC ............. *G06V 10/82* (2022.01); *G06V 10/776* (2022.01)
(58) Field of Classification Search
CPC .............................. G06V 10/82; G06V 10/776
See application file for complete search history.

(56) References Cited

U.S. PATENT DOCUMENTS 10,390,040 B2 * 8/2019 Tian ...................... H04N 19/172
10,685,282 B2 * 6/2020 Rippel ..................... G06N 3/08
(Continued)

FOREIGN PATENT DOCUMENTS

JP       2016-046707 A      4/2016

OTHER PUBLICATIONS

International Search Report for PCT Application No. PCT/JP2021/009250, mailed on Jun. 1, 2021.
(Continued)

*Primary Examiner* — Manav Seth
(74) *Attorney, Agent, or Firm* — Sughrue Mion, PLLC

(57) ABSTRACT

A model learning device determines a first machine learning model so as to further increase a combined loss function obtained by combining: a first loss function indicating the level of change in the reliability of a second image feature in a feature region of a reconstructed image, from the reliability of a first image feature in a feature region of the original image; and a second loss function indicating the level of recognition error. In addition, the model learning device: determines, so as to further reduce the combined loss function, respective parameter sets for a second machine learning model used in the generation of compressed data, and a third machine learning model used in the generation of the reconstructed image from the compressed data; and determines a parameter set for the fourth machine learning model in common with that for the first machine learning model.

11 Claims, 11 Drawing Sheets

(56) References Cited

U.S. PATENT DOCUMENTS

| | | | | |
|---|---|---|---|---|
| 10,740,901 | B2 * | 8/2020 | Myronenko | G06F 18/211 |
| 11,449,713 | B2 * | 9/2022 | Urtasun | H04N 19/91 |
| 11,917,188 | B2 * | 2/2024 | Anderson | H04N 19/176 |
| 11,941,884 | B2 * | 3/2024 | Kuen | G06V 10/751 |
| 2016/0057432 | A1 * | 2/2016 | Shibayama | H04N 19/115 |
| | | | | 375/240.03 |
| 2021/0203997 | A1 * | 7/2021 | Veselov | G06V 10/454 |
| 2021/0211683 | A1 * | 7/2021 | Chou | H04N 19/46 |
| 2024/0007637 | A1 * | 1/2024 | Ma | G06N 3/045 |
| 2025/0166345 | A1 * | 5/2025 | Beye | H04N 19/42 |

OTHER PUBLICATIONS

Eirikur Agustsson et al., "Generative Adversarial Networks for Extreme Learned Image Compression", International Conference on Computer Vision (ICCV 2019), Oct. 27 to Nov. 2, 2019, pp. 221-231.

Yusuke Shinohara et al.,"Video Compression Estimating Recognition Accuracy for Remote Site Object Detection", NEC Corporation, 2020 IWCMC, Jun. 15, 2020, pp. 285-290.

* cited by examiner

FIG. 5

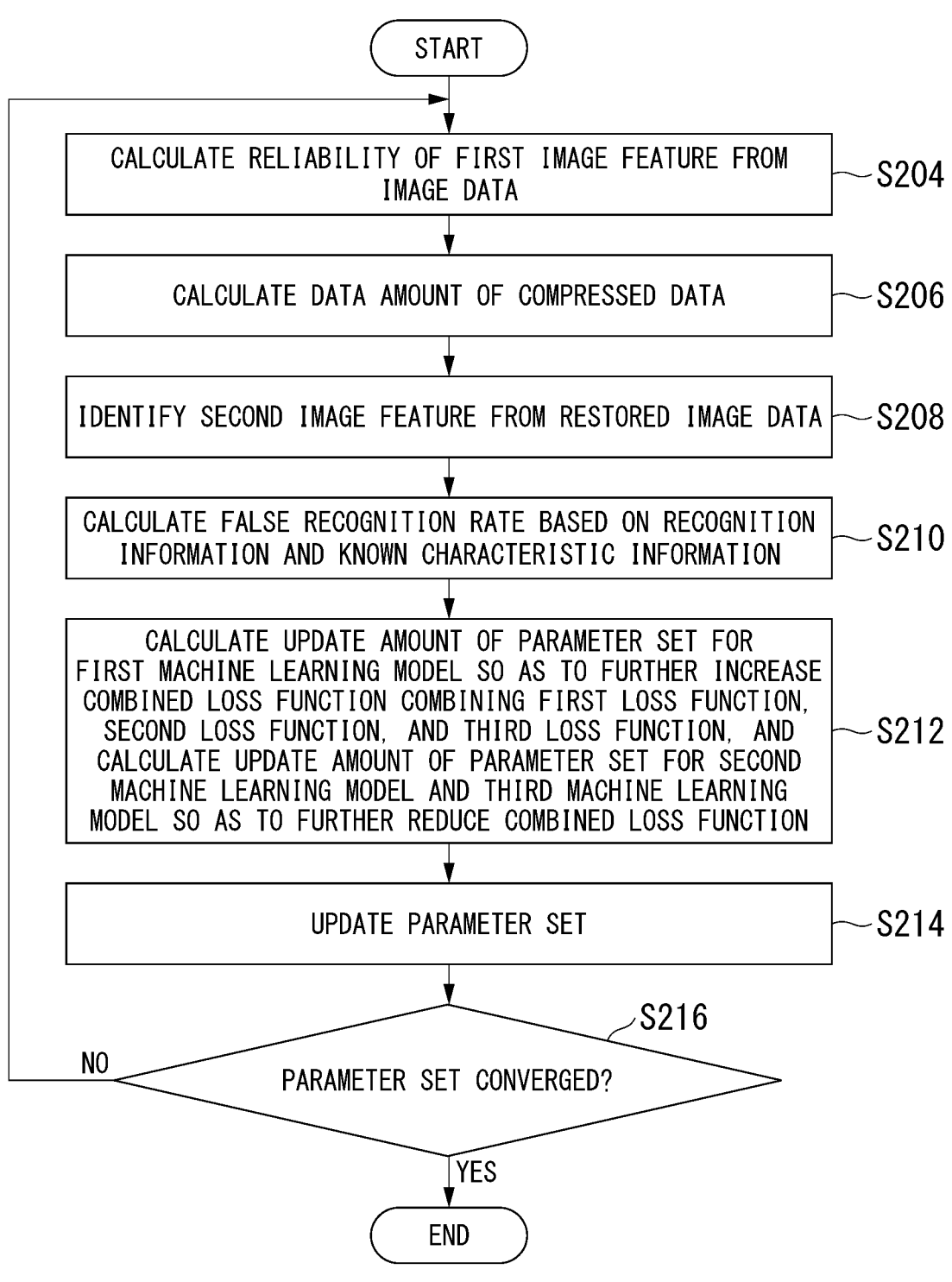

START

CALCULATE RELIABILITY OF FIRST IMAGE FEATURE FROM IMAGE DATA — S204

CALCULATE DATA AMOUNT OF COMPRESSED DATA — S206

IDENTIFY SECOND IMAGE FEATURE FROM RESTORED IMAGE DATA — S208

CALCULATE FALSE RECOGNITION RATE BASED ON RECOGNITION INFORMATION AND KNOWN CHARACTERISTIC INFORMATION — S210

CALCULATE UPDATE AMOUNT OF PARAMETER SET FOR FIRST MACHINE LEARNING MODEL SO AS TO FURTHER INCREASE COMBINED LOSS FUNCTION COMBINING FIRST LOSS FUNCTION, SECOND LOSS FUNCTION, AND THIRD LOSS FUNCTION, AND CALCULATE UPDATE AMOUNT OF PARAMETER SET FOR SECOND MACHINE LEARNING MODEL AND THIRD MACHINE LEARNING MODEL SO AS TO FURTHER REDUCE COMBINED LOSS FUNCTION — S212

UPDATE PARAMETER SET — S214

S216

PARAMETER SET CONVERGED?

NO

YES

END

INFORMATION PROCESSING SYSTEM, INFORMATION PROCESSING DEVICE, INFORMATION PROCESSING METHOD, AND STORAGE MEDIUM

This application is a National Stage Entry of PCT/JP2021/009250 filed on Mar. 9, 2021, the contents of all of which are incorporated herein by reference, in their entirety.

TECHNICAL FIELD

The present invention relates to an information processing system, an information processing device, an information processing method, and a storage medium.

BACKGROUND ART

Non-Patent Document 1 discloses a generative adversarial network (GAN) applied to extreme image compression. The GAN applied to image compression includes an encoder, a quantizer, a generator, and a discriminator. The generator functions as a decoder. The encoder and generator are each configured as a deep neural network (DNN). The encoder outputs to the quantizer an image feature amount based on input image data. The quantizer quantizes the input image feature amount and outputs the quantized image feature amount to the generator. The code corresponding to the quantized image feature amount represents the image with an information amount that is compressed more than the input image data. The generator generates reconstructed image data from the quantized image feature amount.

The discriminator is used when determining parameter sets for the encoder and the generator by learning. The respective parameter sets for the encoder and the generator are determined so as to minimize the loss function. The parameter set for the discriminator is determined so as to maximize the loss function. The loss function is determined based on the divergence of the reconstructed image, the distortion of the reconstructed image, and the compressed information amount (information entropy). In learning, the discriminator uses a region segmented image having the same semantics as the original image data, as additional information for an identification target. Therefore, characteristics of a predetermined image are maintained as the same semantics.

CITATION LIST

Patent Literature

[Non-Patent Document 1] Eirikur Agustsson, Michael Tschannen, Fabian Mentzer, Radu Timofte, and Luc Van Gool, "Generative Adversarial Networks for Extreme Learned image Compression", International Conference on Computer Vision (ICCV 2019), Oct. 27-Nov. 2, 2019

SUMMARY OF THE INVENTION

Problems to be Solved by the Invention

A reconstructed image reconstructed using the method disclosed in Non-Patent Document 1 tends to faithfully restore predetermined features. Depending on the purpose of use, even unnecessary fine patterns may be reproduced. On the other hand, in this approach, it is necessary to provide the decoder with additional information on the identification target. This method aims to improve the recognition rate by reducing distortion and quantitatively improving quality of the reconstructed image. However, visual quality perceived by human vision is not always improved in this method.

An exemplary object of the present invention is to provide an information processing system, an information processing device, an information processing method, and a storage medium capable of solving the problem mentioned above.

Means for Solving the Problems

According to a first exemplary aspect of the present invention, an information processing system includes: a first identification device that identifies a first image feature in a feature region of an original image, by using a first machine learning model for the original image; a compression device that generates compressed data with a reduced data amount, by using a second machine learning model for the original image; a reconstruction device that generates a reconstructed image of the original image from the compressed data, by using a third machine learning model; a second identification device that identifies a second image feature in a feature region of the reconstructed image, by using a fourth machine learning model for the reconstructed image; an image recognition device that performs image recognition processing on the reconstructed image and determines a characteristic of a subject represented in the reconstructed image; and a model learning device that treats a parameter set for the fourth machine learning model in common with that for the first machine learning model, that determines a parameter set for the first machine learning model so as to further increase a combined loss function obtained by combining: a first loss function indicating the level of change in the reliability of the second image feature, from the reliability of the first image feature; and a second loss function indicating the level of recognition error in the image recognition processing, and that determines respective parameter sets for the second machine learning model and the third machine learning model so as to further reduce the combined loss function.

According to a second exemplary aspect of the present invention, an information processing system includes: a first identification device that performs image recognition processing on an original image, by using a first machine learning model, and determines a first characteristic that is a characteristic of a subject in a feature region; a compression device that generates compressed data with a further reduced data amount, by using a second machine learning model for the original image; a reconstruction device that generates a reconstructed image of the original image from the compressed data, by using a third machine learning model; a second identification device that performs image recognition processing on the reconstructed image, by using a fourth machine learning model, and determines a second characteristic that is a characteristic of the subject in the feature region of the reconstructed image; and a model learning device that treats a parameter set for the fourth machine learning model in common with that for the third machine learning model, that determines a parameter set for the first machine learning model so as to further increase a combined loss function indicating the level of reduction in the reliability of the second characteristic, from the reliability of the first characteristic, and that determines respective parameter sets for the second machine learning model and the third machine learning model so as to further reduce the combined loss function.

According to a third exemplary aspect of the present invention, an information processing method in an information processing system includes: a first step of identifying a first image feature in a feature region of an original image, by using a first machine learning model for the original image; a second step of generating compressed data with a further reduced data amount, by using a second machine learning model for the original image; a third step of generating a reconstructed image of the original image from the compressed data, by using a third machine learning model; a fourth step of identifying a second image feature in a feature region of the reconstructed image, by using a fourth machine learning model for the reconstructed image; a step of performing image recognition processing on the reconstructed image and determining a characteristic of a subject represented in the reconstructed image; and a fifth step of treating a parameter set for the fourth machine learning model in common with that for the first machine learning model, determining a parameter set for the first machine learning model so as to further increase a combined loss function obtained by combining: a first loss function indicating the level of change in the reliability of the second image feature, from the reliability of the first image feature; and a second loss function indicating the level of recognition error in the image recognition processing, and determining respective parameter sets for the second machine learning model and the third machine learning model so as to further reduce the combined loss function.

According to a fourth exemplary aspect of the present invention, an information processing method in an information processing system includes: a first step of performing image recognition processing on an original image, by using a first machine learning model, and determining a first characteristic that is a characteristic of a subject in a feature region; a second step of generating compressed data with a further compressed information amount, by using a second machine learning model for the original image; a third step of generating a reconstructed image of the original image from the compressed data, by using a third machine learning model; a fourth step of performing image recognition processing on the reconstructed image, by using a fourth machine learning model, and determining a second characteristic that is a characteristic of the subject in the feature region of the reconstructed image; and a fifth step of treating a parameter set for the fourth machine learning model in common with that for the third machine learning model, determining a parameter set for the first machine learning model so as to further increase a combined loss function indicating the level of reduction in the reliability of the second characteristic, from the reliability of the first characteristic, and determining respective parameter sets for the second machine learning model and the third machine learning model so as to further reduce the combined loss function.

According to a fifth exemplary aspect of the present invention, an information processing device includes a model learning device that determines a first machine learning model so as to further increase a combined loss function obtained by combining: a first loss function indicating the level of change in the reliability of a second image feature in a feature region of the reconstructed image of the original image, the feature region being identified by using a fourth machine learning model on the reconstructed image, from the reliability of a first image feature in a feature region of the original image identified by using the first machine learning model on the original image; and a second loss function indicating the level of recognition error in image recognition processing of the reconstructed image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

According to a sixth exemplary aspect of the present invention, an information processing device includes a model learning device that determines a first machine learning model so as to further increase a combined loss function indicating the level of reduction in the reliability of a second characteristic that is a characteristic of a subject determined in a feature region of a reconstructed image by performing image recognition processing, by using a fourth machine learning model for the reconstructed image of an original image, from the reliability of a first characteristic that is a characteristic of the subject determined in a feature region of the original image by performing image recognition processing, by using the first machine learning model for the original image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

Advantageous Effects of Invention

According to the present invention, the visual quality of a reconstructed image and the recognition rate of image recognition can be improved.

BRIEF DESCRIPTION OF THE DRAWINGS

FIG. 5 A flowchart showing an example of model learning processing according to the first exemplary embodiment.

EXAMPLE EMBODIMENT

Hereinafter, preferred exemplary embodiments of the present invention will be described, with reference to the drawings.

First Exemplary Embodiment

Figure 1:
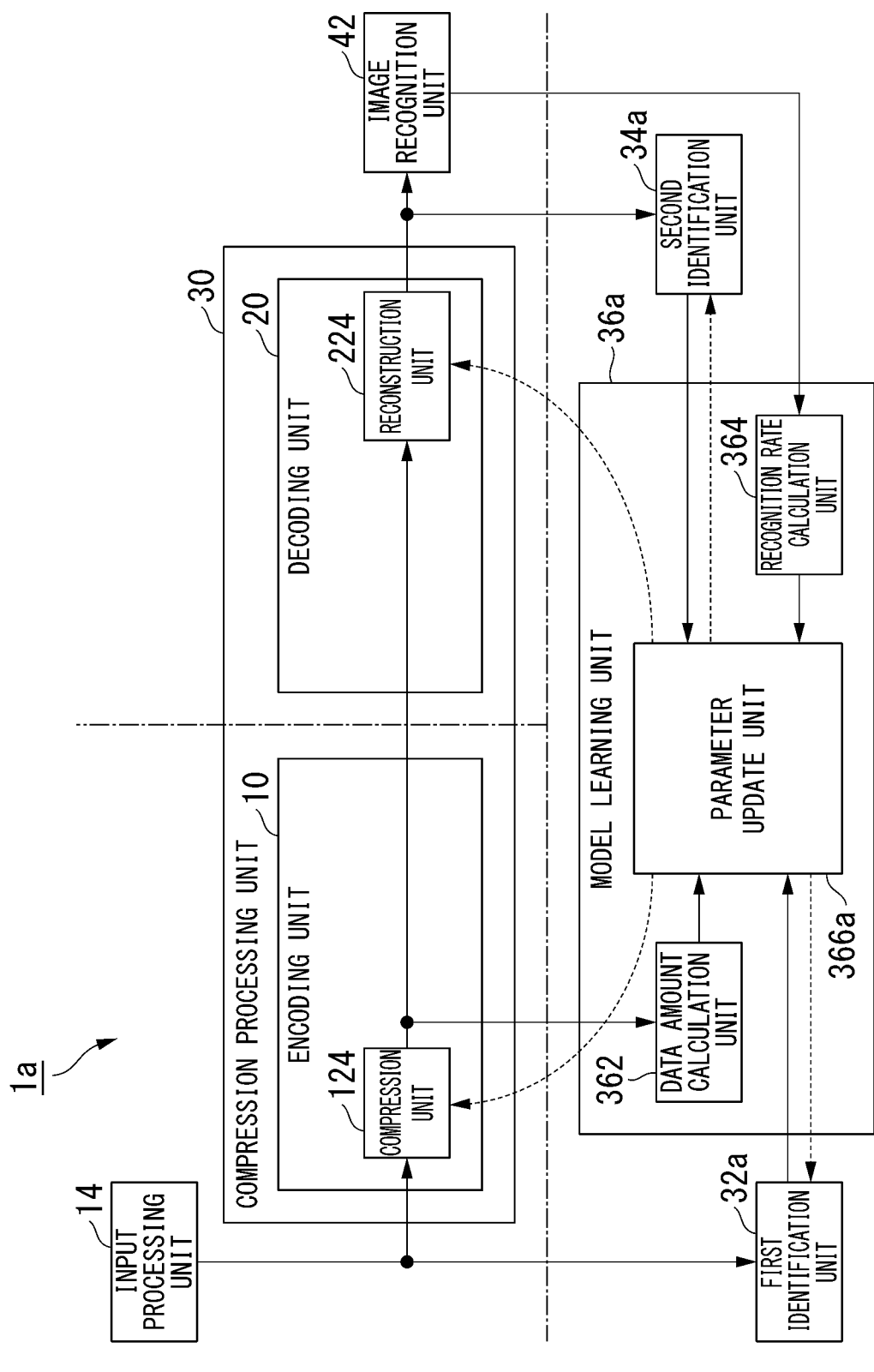
FIG. 1 A schematic block diagram showing a configuration example of an information processing system according to a first exemplary embodiment.

A first exemplary embodiment will be described below. FIG. 1 is a schematic block diagram showing a configuration example of an information processing system 1a according to the present exemplary embodiment. The information processing system 1a acquires image data representing an image (original image) and compresses the data amount of the acquired image data to generate compressed data. The information processing system 1a expands the data amount of the generated compressed data to generate reconstructed data representing a reconstructed image of the original image. The information processing system 1a performs image recognition processing on the generated reconstructed data and determines the characteristic of a subject represented in the reconstructed image.

The information processing system 1a roughly includes an input processing unit 14, a compression processing unit 30, a first identification unit 32a, a second identification unit 34a, a model learning unit 36a, and an image recognition unit 42. The specific configurations of these units are as follows.

The compression processing unit 30 includes an encoding unit 10 and a decoding unit 20. The information processing system 1a may be configured as a distributed processing system in which a plurality of devices are distributed at spatially different locations. For example, the information processing system 1a may include an edge device (not shown in the drawings) and a data center (not shown in the drawings). In the example shown in FIG. 1, one or more functional units can be arranged in each individual region separated by the dashed-dotted line. Each individual region indicates that the location or time thereof may differ.

When the information processing system 1a is configured as a distributed processing system including an edge device and a data center as mentioned above, the edge device is installed near the source of processing target information in the distributed processing system, and is a device that has computing resources for that information. In the example shown in FIG. 1, image data corresponds to the processing target information. In the information processing system 1a, for example, an edge device including the input processing unit 14 and the encoding unit 10 may be arranged. The number of edge devices is not limited to one, and may be two or more. Each edge device may be further connected to an imaging unit 16 (described later) in a wireless or wired manner.

On the other hand, the data center includes one or more devices that execute processing related to the entire distributed processing system using various types of information provided by the edge device. The data center may be installed at a location remote from an edge device. The data center is communicably connected to each individual edge device via a network in a wireless or wired manner.

In the information processing system 1a, the data center that includes the decoding unit 20 and the image recognition unit 42 may be arranged. The data center may further include the first identification unit 32a, the second identification unit 34a, and the model learning unit 36a.

The data center is not limited to being a single device, and may be configured as a cloud environment including a plurality of devices. In the information processing system 1a, for example, a model learning device including the first identification unit 32a, the second identification unit 34a, and the model learning unit 36a may be arranged separately from a server device including the decoding unit 20 and the image recognition unit 42.

The model learning processing executed by the model learning device may be performed in parallel with the data compression/restoration processing performed by the edge device and the server device in cooperation (online processing), or may be performed at a different time (offline processing).

The input processing unit 14 acquires image data. The input processing unit 14 receives, for example, an input of image data indicating an image captured by the imaging unit. Image data may be input to the input processing unit 14 from another device. The input processing unit 14 includes, for example, an input interface. The input processing unit 14 may include the imaging unit. The input processing unit 14 outputs the acquired image data to the encoding unit 10 and the first identification unit 32a. In the present application, the image indicated by the acquired image data may be referred to as "original image" in some cases.

The encoding unit 10 includes a compression unit 124.

The compression unit 124 generates compressed data that is an image feature amount representing the feature of the image indicated by the image data input from the input processing unit 14, and that indicates the image feature amount having a data amount smaller than that of the image data. Here, the compression unit 124 determines the image feature amount from the input image data, by using a second machine learning model. The compression unit 124 quantizes the determined image feature amount and generates compressed data representing one or more quantized values obtained by quantization. The compression unit 124 outputs the generated compressed data to the decoding unit 20 and the model learning unit 36a.

The decoding unit 20 includes a reconstruction unit 224.

The reconstruction unit 224 de-quantizes the data series forming the compressed data input from the encoding unit 10, and determines one or more quantized values of the image feature amount represented by the data series. The reconstruction unit 224 restores the image having the characteristic indicated by one or more determined quantized values, as a reconstructed image. Here, the reconstruction unit 224 generates reconstructed image data representing the reconstructed image from the compressed data input from the encoding unit 10, by using a third machine learning model. The reconstruction unit 224 outputs the generated reconstructed image data to the image recognition unit 42 and the second identification unit 34a.

Therefore, the compression processing unit 30 includes the compression unit 124 and the reconstruction unit 224, and functions as a generator that generates reconstructed image data based on image data representing the original image input from the input processing unit 14.

The image recognition unit 42 performs commonly known image recognition processing on the reconstructed image data input from the reconstruction unit 224 and determines the characteristic of the subject represented in the reconstructed image as the recognition result. The characteristic of the subject serving as the recognition result may be preliminarily set according to the function required by the output destination. In the image recognition processing, the image recognition unit 42 may employ a method of using a fifth machine learning model separate from the first to fourth machine learning models. In the present exemplary embodiment, the parameter set for the fifth machine learning model need not be the target of model learning performed by the model learning unit 36*a*. The image recognition unit 42, for example, divides the entire region of the reconstructed image into one or more subdivided regions (hereinafter, referred to as "segments") (segmentation), and specifies the type of subject represented in each segment. The specified segment can be used to analyze the shape, size, distance, and so forth of the subject. That is to say, according to the image recognition processing, at least the type of subject and spatial information are determined as subject characteristics. Information indicating these characteristics is referred to as semantics of the image. The image recognition unit 42 outputs recognition information indicating the recognition result to a predetermined output destination and the model learning unit 36*a*. The predetermined output destination may be another functional unit in the device including the image recognition unit 42, or may be a separate device such as a personal computer, a multifunctional mobile phone, or other information device including a user interface. Also, the image recognition unit 42 may store the recognition information in a storage medium without outputting it.

From the image indicated by the image data input from the input processing unit 14, the first identification unit 32*a* determines the reliability (confidence) of a first image feature that is a feature of a predetermined image in a feature region (specific region), which is a partial region of the image indicated by the image data input from the input processing unit 14, by using the first machine learning model. The feature region is a region that is likely to be a region of interest (RoI) in which an observer is interested. The feature region may be the entire image. The first identification unit 32*a* functions as a discriminator for identifying the first image feature from image data. The first identification unit 32*a* outputs the determined reliability of the first image feature to the model learning unit 36*a*.

From the reconstructed image indicated by the reconstructed image data input from the reconstruction unit 224, the second identification unit 34*a* determines the reliability of a second image feature that is a feature of a predetermined image in a feature region, which is a partial region of the reconstructed image, by using the fourth machine learning model. In the fourth machine learning model, the same type of technique as for the first machine learning model is applied and the same model parameters as those of the first machine learning model are used. The second identification unit 34*a* outputs the determined reliability of the second image feature to the model learning unit 36*a*.

The second identification unit 34*a* functions as a discriminator for identifying the second image feature from reconstructed image data. The second image feature is a term for distinguishing the image feature identified from the reconstructed image, from the image feature from the original image indicated in the image data provided from the input processing unit 14 to the first identification unit 32*a*. Moreover, in the second identification unit 34*a*, a parameter set in common with that for the first machine learning model is set as the parameter set for the fourth machine learning model. If the reconstructed image is completely the same as the original image indicated by the image data provided from the input processing unit 14 to the first identification unit 32*a*, the reliability determined by the second identification unit 34*a* is equal to the reliability determined by the first identification unit 32*a*. The difference in reliability tends to increase as the image feature of the reconstructed image differs more from the image feature of the original image.

The model learning unit 36*a* includes a data amount calculation unit 362, a recognition rate calculation unit 364, and a parameter update unit 366*a*.

The data amount calculation unit 362 estimates the data amount of the code generated when the compressed data input from the compression unit 124 is encoded using entropy coding, and outputs the value of the data amount obtained by the estimation to the parameter update unit 366*a*.

The recognition rate calculation unit 364 compares, for example, the recognition information input from the image recognition unit 42 with the characteristic information indicating the characteristics of the known subject represented in the original image, and determines the false recognition rate (error rate) indicating the level of error in the recognition result indicated by the recognition information. The characteristic information corresponds to true information indicating the characteristic of the subject that is considered true. The recognition rate calculation unit 364 may determine the false recognition rate by averaging false recognition rates among a plurality of original images. The recognition rate calculation unit 364 outputs the determined false recognition rate to the parameter update unit 366*a*.

For example, the recognition rate calculation unit 364 may determine either one of the first error rate and the second error rate as the recognition rate, or use both the first error rate and the second error rate to determine the false recognition rate.

The first error rate corresponds to the frequency of differences between the type of subject on the reconstructed image indicated by the recognition information and the type of object on the original image indicated by the characteristic information. Recognition errors include substitution errors, insertion errors, and loss errors. A substitution error is an event in which the type of subject recognized in a segment of a reconstructed image is different from the type of subject in the corresponding segment of the original image. An insertion error is an event in which the segment corresponding to a segment in the reconstructed image does not exist in the original image. A loss error is an event in which, for any segment in the original image, the corresponding segment does not exist in thein the reconstructed image. The recognition rate calculation unit 364 can count the number of pixels with recognition errors among the pixels forming the reconstructed image, divide the counted number of pixels by the total number of pixels, and determine the first error rate.

The second error rate corresponds to the degree of difference between one or more segments that segment the reconstructed image indicated in the recognition information and one or more segments of the original image. The recognition rate calculation unit 364 can, for example, calculate the cross entropy between the probability distribution of segments in the original image and the probability distribution of segments in the reconstructed image, as the second error rate. The probability distribution of segments of an original image is defined for each single segment of the original image, for example, where the probability for the pixel in one segment of the original image is 1 and the probability for the pixel in other segments of the original image is 0. The probability distribution of segments of a reconstructed image is defined for each single segment of the reconstructed image, for example, where it includes the probability of the pixel in one segment of the reconstructed image belonging to each segment of the original image. Then the cross entropy is obtained as the sum of combining; the product of the probability for the pixel in the segment of the original image and the logarithm of the probability of belonging to each segment of the original image in the segment of the reconstructed image, the pixel, the segments of the reconstructed image, and the original image.

When determining the false recognition rate using both the first error rate and the second error rate, the recognition rate calculation unit 364 determines, as the false recognition rate, the weighted sum that is the sum of the products obtained by multiplying each of the first error rate and second error rate by a predetermined weight coefficient (weight).

As the entire image data related to the processing, the parameter update unit 366a updates respective parameter sets for the second machine learning model and the third machine learning model so as to at least further reduce the combined loss function obtained by combining a first loss function and a second loss function (minimization), and updates the parameter set for the first machine learning model so as to further increase the combined loss function (maximization). In the present application, minimization includes searching for a parameter set that further reduces the combined loss function, and is not limited to absolutely minimizing the combined loss function. Therefore, the combined loss function may temporarily increase during the course of processing. Maximization includes searching for a parameter set that further increases the combined loss function, and is not limited to absolutely maximizing the combined loss function. Therefore, the combined loss function may be temporarily reduced during the course of processing. When updating parameter sets, the parameter update unit 366a may use methods such as the steepest descent method and stochastic gradient descent method.

The first loss function is a component that indicates the level of change in the reliability of the second image feature input from the second identification unit 34a, from the reliability of the first image feature input from the first identification unit 32a. The first loss function is an index that quantitatively indicates change in the reliability of image features identified through compression and restoration, and is also called GAN (Generative Adversarial Network) loss. For example, as shown in Equation (1), the first loss function $L_1$ quantitatively indicates the level of divergence between the distribution of the reliability $D(x)$ of the first image feature and the distribution of the reliability $D(G(x))$ of the second image feature.

[Equation 1]

$$L_1 = f_1(D(x)) + f_2(D(G(x)))\qquad(1)$$

In Equation (1), x denotes the original image. $G(x)$ denotes the reconstructed image. $D( \ . \ . \ . \ )$ denotes the reliability of a predetermined image feature each identified by the first identification unit 32a and the second identification unit 34a from the image . . . . Here $f_1( \ . \ . \ . \ )$ and $f_2( \ . \ . \ . \ )$ are scalar functions for real numbers . . . corresponding to reliability. However, the reliability $f_1(y)$ and $f_2(y)$ under the common real number y (where the range of value is between 0 and 1) may be complementary functions. For example, functions $f_1(y)$ and $f_2$ (y) may be defined as shown in Equation (2) so as to correspond to chi-square divergence ($\chi^2$-divergence).

[Equation 2]

$$f_1(y) = y^2, f_2(y) = (y-1)^2\qquad(2)$$

In the example shown in Equation (2), the function $f_2(y)$ monotonically decreases when the function $f_1(y)$ monotonically increases as y increases.

Note that the number of predetermined image features that can be identified by the first identification unit 32a and the second identification unit 34a is not limited to one, and may be multiple. In such a case, the first identification unit 32a and the second identification unit 34a may calculate the reliability for each of the plurality of image features. Then, for the reliability of each of the plurality of image features, the parameter update unit 366a may use the first loss function $L_1$ defined by means of simple average or weighted average of the contribution found from the right-hand side of Equation (1).

The second loss function is an index that indicates the level of recognition error due to the image recognition processing. For the second loss function, for example, the false recognition rate input from the recognition rate calculation unit 364 may be used directly. The second loss function is also called recognition loss.

The parameter update unit 366a may use a combined loss function obtained by further combining a third loss function. The third loss function is an index indicating the data amount of compressed data. For the third loss function, for example, the data amount input from the data amount calculation unit 362 may be used directly. The third loss function is also called bitrate loss.

Combining the first loss function or the like means calculating the combined loss function so that the combined loss function monotonically increases as the first loss function or the like increases. For example, the weighted sum of the first loss function $L_1$, the second loss function $L_2$, and the third loss function $L_3$ is taken as the combined loss function L as shown in Equation (3).

[Equation 3]

$$L = L_1 + \beta L_2 + \lambda L_3\qquad(3)$$

However, in the example shown in Equation (3), the weight coefficients of the first loss function $L_1$, the second loss function $L_2$, and the third loss function $L_3$ are 1, $\beta$, and $\lambda$, respectively.

The parameter update unit 366a updates the parameter set for the first machine learning model so as to further increase the expectation of the combined loss function L, and updates the parameter sets for the second machine learning model and the third machine learning model so as to further reduce the expectation of the combined loss function L. The parameter set for the fourth machine learning model is common with the parameter set for the first machine learning model. The parameter update unit 366a determines the parameter set for the first machine learning model for each update as the post-update parameter set for the fourth machine learning model.

The parameter update unit 366a uses a predetermined calculation equation determined according to the combined loss function L to determine the update amount of each parameter set, and adds the determined update amount to the parameters at that time to calculate the post-update parameter set. The parameter update unit 366a repeats the process of determining the update amount of the parameter set and the process of updating the parameter set. The repetition may be performed a predetermined number of times or until the parameter set is determined as having converged. The parameter update unit 366a may judge whether or not convergence has occurred based on whether or not the magnitude of the difference between the combined loss function before updating the parameter set and the combined loss function after updating is equal to or less than a predetermined magnitude threshold value. When repeating parameter set update, the parameter update unit 366a may alternately update the parameter set for the first machine learning model and update the parameter sets for the second machine learning model and the third machine learning model.

Note that the parameter update unit 366a according to the present exemplary embodiment may set the reliability target value to 1 for an original image the feature region of which includes the first image feature, and set the reliability target value to 0 for an original image the feature region of which does not include the first image feature, and set the reliability target value to 0 for other image features that are not included in the original image. The parameter update unit 366a may update the parameter set for the first machine learning model so that the estimated value of the reliability of the second image feature estimated for a reconstructed image corresponding to an original image including the first image feature, and the estimated value of the reliability of the second image feature estimated for a reconstructed image corresponding to an original image not including the first image feature, both approximate their target values. In the present exemplary embodiment, the value ranges of the reliability calculated by the first identification unit 32a and the reliability calculated by the second identification unit 34a are bounded by real numbers between 0 and 1. Conversely, the parameter update unit 366a may update the parameter sets for the second machine learning model and the third machine learning model so that the above estimated values move away from the respective target values.

The parameter update unit 366a sets the updated parameter set for the first machine learning model and the updated parameter set for the fourth machine learning model to the first machine learning model 32a and the second identification unit 34a, respectively. The parameter update unit 366a sets the updated parameter set for the third machine learning model and the updated parameter set for the fourth machine learning model to the compression unit 124 and the reconstruction unit 224, respectively.

It should be noted that the first machine learning model to the fifth machine learning model may be any type of neural network such as CNN (convolutional neural network), RNN (recurrent neural network), and the like. The first machine learning model to the fifth machine learning model may be mathematical models other than neural networks, such as random forests. It is, however, assumed that the fourth machine learning model is the same type of mathematical model as the first machine learning model.

Figure 2:
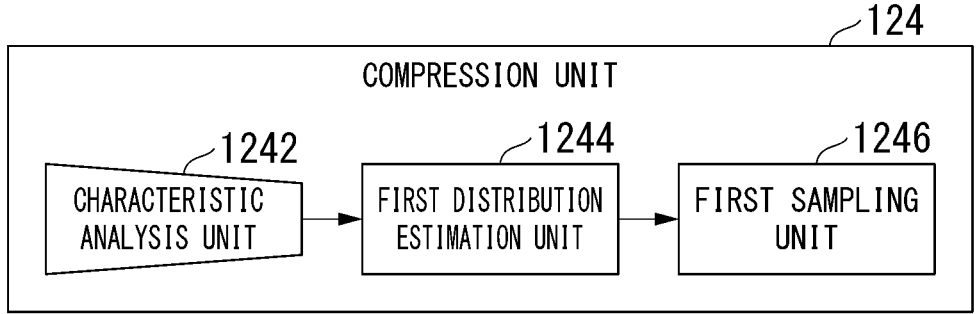
FIG. 2 A schematic block diagram showing a configuration example of a compression unit according to the first exemplary embodiment.

Next, a configuration example of the compression unit 124 will be described. FIG. 2 is a schematic block diagram showing a configuration example of the compression unit 124. The compression unit 124 includes a characteristic analysis unit 1242, a first distribution estimation unit 1244, and a first sampling unit 1246.

The characteristic analysis unit 1242 analyzes the image feature amount representing the characteristic of the image shown in the input image data as a first characteristic value, by using a first type machine learning model, and outputs the determined first characteristic value to the first distribution estimation unit 1244. The image data typically indicates signal values for each pixel. The first type machine learning model is a mathematical model that constitutes a part of the second machine learning model. The image feature amount to be analyzed may be, for example, a specific type of image feature amount such as a luminance gradient, edge distribution, or the like. In the case where the first type machine learning model is a neural network, the output value may be made at each node included in a predetermined layer among the layers thereof.

The first distribution estimation unit 1244 takes individual element values as input values for one or more element values included in the first characteristic value input from the characteristic analysis unit 1242, and uses a second type machine learning model to estimate a first probability distribution of quantized values for each input value. The first distribution estimation unit 1244 outputs the estimated first probability distribution to the first sampling unit 1246. The quantized values are numerical values distributed in a predetermined value range and discretized. The second type machine learning model is a mathematical model separate from the first type machine learning model and constitutes a part of the second machine learning model. The first probability distribution includes probabilities for each quantized value in a predetermined value range.

The second type machine learning model is a mixture model that determines, as the first probability distribution, the probability distribution including the probability obtained by normalizing, for each quantized value, the product of the prior probability of the quantized value and the conditional probability of the input value conditional on that quantized value, for example. The normalization is realized by performing division by the sum of the products for each quantized value in the value range.

The first distribution estimation unit 1244 uses, for example, a Gaussian Mixture Model (GMM) to calculate the conditional probability of the input value for each quantized value and the prior probability for each quantized value. The Gaussian mixture model is a mathematical model that takes a predetermined number of normal distributions (Gaussian functions) as the basic functions and represents the continuous probability distribution as a linear combination of these basic functions. Therefore, the second type machine learning model parameter set includes weight coefficient, mean, and variance, which are parameters of each individual normal distribution. These parameters are all represented by real numbers. Therefore, the conditional probabilities, the prior probabilities, and the probabilities for each quantized value determined using these are differentiable with respect to the above parameters.

The first sampling unit 1246 samples one quantized value from the set value range according to the first probability distribution input from the first distribution estimation unit 1244, and determines the sampled quantized value as a first sample value. The first sampling unit 1246, for example, generates a pseudo-random number that is a quantized value within the value range thereof and occurs at the probability of that quantized value. The first sampling unit 1246 determines the generated pseudo-random number as the first sample value. The first sampling unit 1246 accumulates the first sampled values in the order in which they are obtained, and generates a data sequence including a predetermined number of the first sample values as compressed data. The first sampling unit 1246 outputs the generated compressed data to the decoding unit 20.

Figure 3:
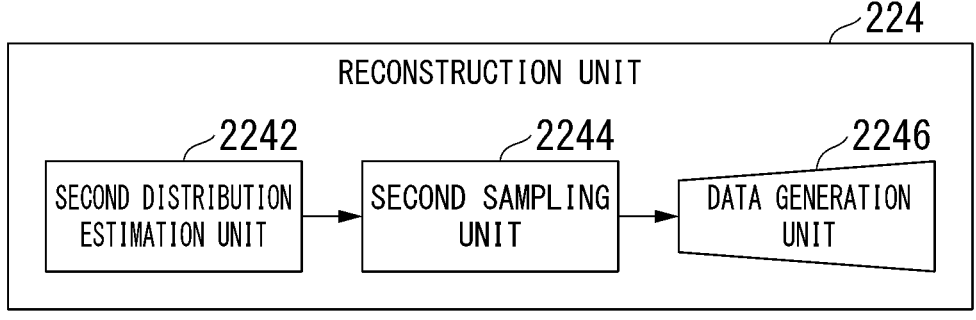
FIG. 3 A schematic block diagram showing a configuration example of a reconstruction unit.

Next, a configuration example of the reconstruction unit 224 will be described. FIG. 3 is a schematic block diagram showing a configuration example of the reconstruction unit 224. The reconstruction unit 224 includes a second distribution estimation unit 2242, a second sampling unit 2244, and a data generation unit 2246.

The second distribution estimation unit 2242 estimates, as the second probability distribution, the probability distribution corresponding to each of the first sample values included in the data sequence forming the compressed data input from encoding unit 10, by using a third type machine learning model. The second distribution estimation unit 2242 outputs the second probability distribution information indicating estimated second probability distribution to the second sampling unit 2244. The third type machine learning model may be any mathematical model that can determine the probability distribution using a continuous probability density function corresponding to the first sample values. For example, GMM can be used as the third type machine learning model. In such a case, the second probability distribution information includes weight coefficient, mean, and variance, which are parameters of each individual normal distribution.

The second sampling unit 2244 samples one real number from the set value range, according to the second probability distribution given by the second probability distribution information input from the second distribution estimation unit 2242. Here, the second sampling unit 2244, for example, generates a pseudo-random number that is any real number within the value range thereof, so that it appears with the probability of that real number, and determines the generated pseudo-random number as a sampled real number. Then, second sampling unit 2244 determines a quantized value obtained by quantizing the sampled real number as a second sample value. The second sampling unit 2244 outputs the determined second sample value to the data generation unit 2246.

The data generation unit 2246 takes the second sample value input from the second sampling unit 2244 as an element value, and determines a second characteristic value including one or more element values. With respect to the image feature amount being the determined second characteristic value, the data generation unit 2246 generates reconstructed image data of a reconstructed image having the feature indicated by the determined image feature amount, by using a fourth type machine learning model. The data generation unit 2246 outputs the generated reconstructed image data to the image recognition unit 42 and the second identification unit 34a. The fourth type machine learning model is a machine learning model separate from the third type machine learning model and constitutes a part of the third machine learning model. The fourth type machine learning model may be any mathematical model that is of the same type as that of the first type machine learning model, for example. In the case where the first type machine learning model is a neural network, the fourth type machine learning model may also be a neural network. According to the configurations shown in FIG. 2 and FIG. 3, the image feature amount of each original image is non-deterministically quantized.

Moreover, the configuration example of the compression unit 124 and the configuration example of the reconstruction unit 224 are not limited to these examples. In the compression unit 124, the first distribution estimation unit 1244 and the first sampling unit 1246 may be omitted. In such a case, the compression unit 124 may determine quantization values, using the first characteristic values obtained from the characteristic analysis unit 1242, at predetermined quantization intervals. The compression unit 124 outputs a data sequence obtained by accumulating determined quantized values as first sample values, as compressed data to the decoding unit 20. In the reconstruction unit 244, the second distribution estimation unit 2242 and the second sampling unit 2244 may be omitted. In such a case, the reconstruction unit 244 outputs, as second sample values, the first sample values included in the data sequence forming the compressed data input from the encoding unit 10, to the data generation unit 2246.

Figure 4:
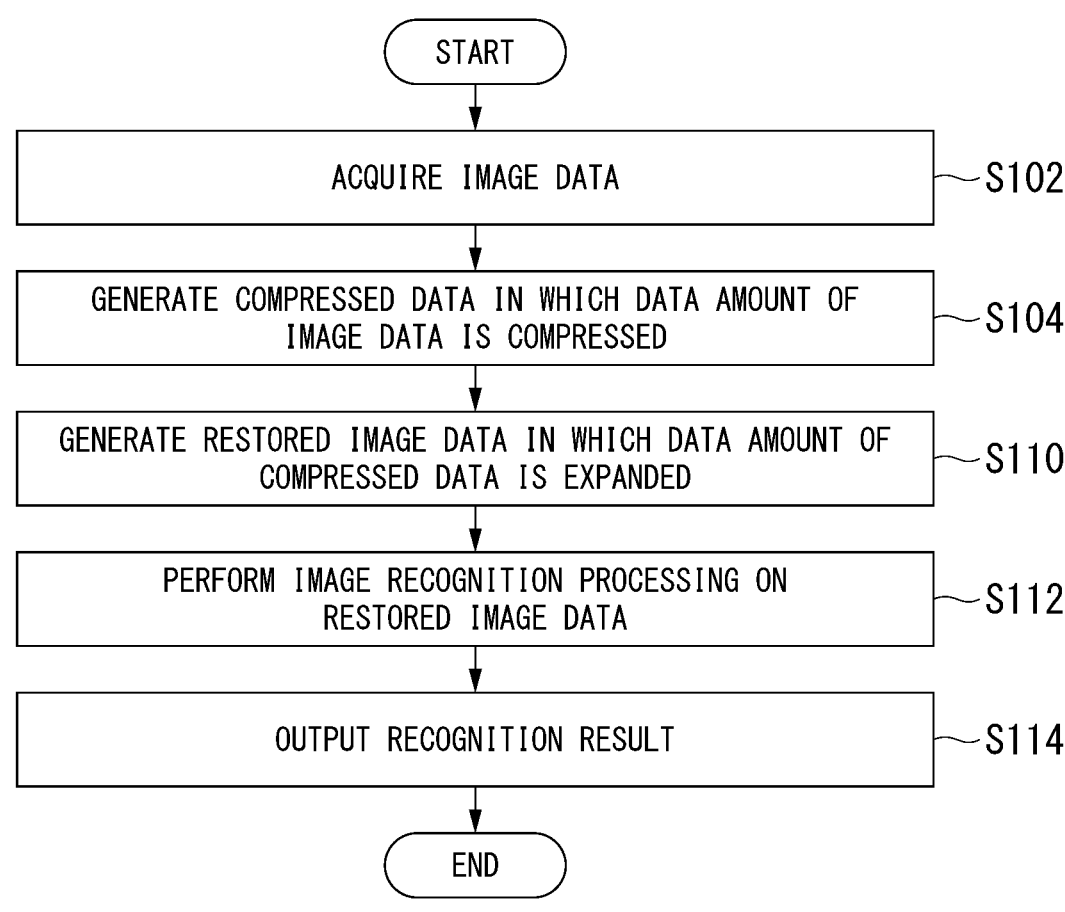
FIG. 4 A flowchart showing an example of image compression/restoration processing according to the first exemplary embodiment.

Next, an example of image compression/restoration processing according to the exemplary embodiment will be described. FIG. 4 is a flowchart showing an example of the image compression/restoration processing according to the present exemplary embodiment.

(Step S102) The input processing unit 14 acquires image data to be processed and outputs it to the compression unit 124.

(Step S104) The compression unit 124 compresses the data amount of the image data by using the second machine learning model, and generates compressed data representing the image feature amount of the image. The compression unit 124 outputs the generated compressed data to the decoding unit 20.

(Step S110) The reconstruction unit 224 expands the data amount of the data sequence forming the compressed data input from the encoding unit 10, by using the third machine learning model, and restores the reconstructed image data representing the reconstructed image. The reconstruction unit 224 outputs the reconstructed image data to the image recognition unit 42.

(Step S112) The image recognition unit 42 performs the image recognition processing on the reconstructed image data.

(Step S114) The image recognition unit 42 outputs recognition information indicating the recognition result of the image recognition to a predetermined output destination. Then, the process of FIG. 4 ends.

Next, an example of model learning processing according to the present exemplary embodiment will be described. FIG. 5 is a flowchart showing an example of the model learning processing according to the present exemplary embodiment.

(Step S204) The first identification unit 32a calculates the reliability of the first image feature identified from the image indicated by the image data acquired from the input processing unit 14, by using the first machine learning model.

(Step S206) The data amount calculation unit 362 determines the data amount of the compressed data acquired from the compression unit 124.

(Step S208) The second identification unit 34a determines the reliability of the second image feature identified from the reconstructed image indicated by the reconstructed image data acquired from the reconstruction unit 224, by using the fourth machine learning model.

(Step S210) The recognition rate calculation unit 364 calculates the false recognition rate based on the recognition information and the characteristic information acquired from the image recognition unit 42.

(Step S212) The parameter update unit 366a calculates the update amount of the parameter set for the first machine learning model so as to further increase the combined loss function combining the first loss function, the second loss function, and the third loss function, and calculates the update amount of the respective parameter sets for the second machine learning model and the third machine learning model so as to further reduce the combined loss function. However, the model parameters for the fourth machine learning model are common with the parameter set for the first machine learning model. The first loss function is an index that indicates the level of change in the reliability of the second image feature, from the reliability of the first image feature. The second loss function is an index that indicates the level of recognition error based on the false recognition rate. The third loss function is an index indicating the data amount of compressed data.

(Step S214) The parameter update unit 366a updates the respective parameter sets for the first machine learning model to the fourth machine learning model, using the update amounts determined for each.

(Step S216) The parameter update unit 366a determines whether or not the parameter sets have converged. If determined as having converged (Step S216: YES), the process of FIG. 5 ends. If determined as not having converged (Step S216: NO), the process returns to Step S204.

It should be noted that the model learning process shown in FIG. 5 may be executed in parallel with the process shown in FIG. 4 (online learning), or may be executed independently from the process shown in FIG. 4 (offline learning). The model learning unit 36a may include function units corresponding to the input processing unit 14, the compression unit 121, the reconstruction unit 224, the first identification unit 32a, the second identification unit 34a, and the image recognition unit 42 so as to be able to independently execute the model learning processing. The information processing system 1a may be realized as an information processing device that includes the model learning unit 36a.

As has been described above, according to the present exemplary embodiment, the parameter set for the first machine learning model are defined so as to at least further increase the combined loss function combining the first loss function and the second loss function, and the respective parameter sets for the second machine learning model and the third machine learning model are defined so as to further reduce the combined loss function. The parameter set for the first machine learning model are common with the parameter set for the fourth machine learning model. The first machine learning model is used for determining the reliability of a first image feature identified from a feature region of an original image. The second machine learning model is used for generating compressed data with a further reduced data amount for the original image. The third machine learning model is used for generating a reconstructed image from the compressed data. The fourth machine learning model is used for determining the reliability of a second image feature identified from a feature region of the reconstructed image. The first loss function indicates the level of change in the reliability of the second image feature, from the reliability of the first image feature. The second loss function indicates the level of recognition error in the image recognition processing performed on the reconstructed image.

According to this configuration, it is possible to obtain a reconstructed image in which image features in a feature region of an original image, and recognition rate of the image recognition processing are both maintained to the greatest possible extent. As a result, the visual quality of a reconstructed image and the recognition rate of image recognition can both be improved.

Moreover, the combined loss function may be obtained by further combining the third loss function that indicates the size of the data amount of compressed data.

According to such a configuration, it is possible to reduce the data amount of compressed data while maintaining the visual quality of the reconstructed image and the recognition rate of image recognition to the greatest possible extent.

Second Exemplary Embodiment

Next, a second exemplary embodiment will be described below. The following description mainly focuses on differences from the exemplary embodiment described above. Configurations and processes common to those of the first exemplary embodiment are denoted by common reference signs unless otherwise specified, and descriptions thereof are incorporated. A common reference sign may include a case where a parent number (for example, "32" of "first identification unit 32a") that shares a part of a reference sign, and a child sign (for example, "a" of "first identification unit 32a") differs from that of the reference sign.

Figure 6:
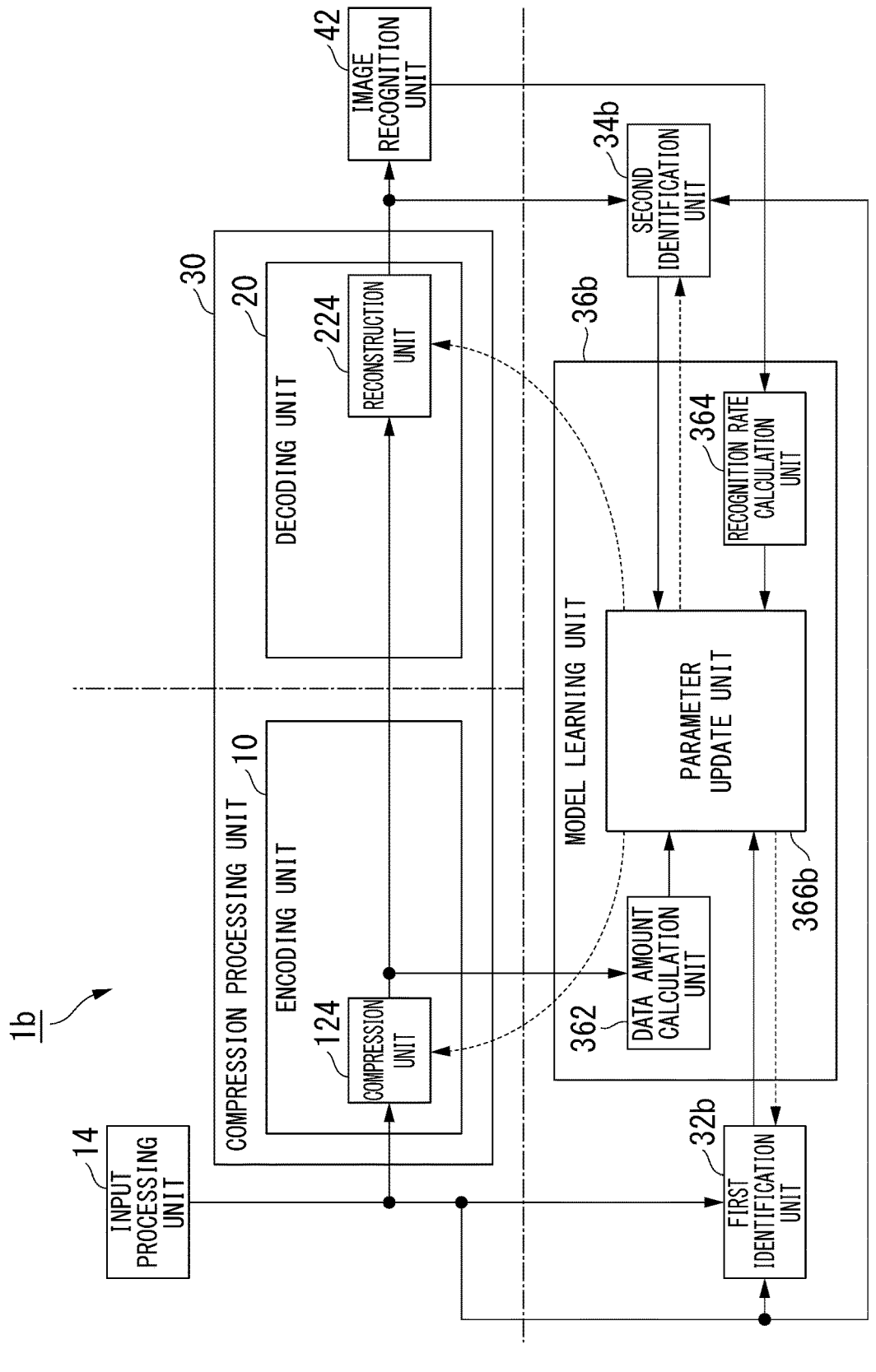
FIG. 6 A schematic block diagram showing a configuration example of an information processing system according to a second exemplary embodiment.

FIG. 6 is a schematic block diagram showing a configuration example of an information processing system 1b according to the present exemplary embodiment. The information processing system 1b roughly includes the input processing unit 14, the compression processing unit 30, a first identification unit 32b, a second identification unit 34b, a model learning unit 36b, and the image recognition unit 42. The specific configurations of these units are as follows.

In model learning, as the first loss function, the model learning unit 36b uses an index that indicates, from the reliability of the first image feature identified on condition of a predetermined event pertaining to an original image indicated by image data acquired by the input processing unit 14, the level of change in the reliability of the second image feature identified on condition of the event.

The input processing unit 14 acquires related information indicating the predetermined event related to the image indicated by the acquired image data. The input processing unit 14 outputs the acquired image data and related information associated therewith to the first identification unit 32b. Also, the input processing unit 14 outputs the acquired related information to the second identification unit 34b. In the second identification unit 34b, the related information from the input processing unit 14 is associated with the reconstructed image data based on the image data output to the first identification unit 32b.

The predetermined event can be any of an event, a phenomenon, a state, and so forth associated with the image. The event may be, for example, any of an event, a phenomenon, a state, and so forth occurring in the imaging target space, which is a target of image capturing in the image. For example, the event may be a positional relationship between a plurality of subjects, a change therein over time (for example, moving speed, moving direction), brightness in the field of view, or an environment such as time of day, day of week, and weather. The imaging target space is a space within a range corresponding to the feature region on an image. Taking traffic condition monitoring at an intersection as an example, events such as a vehicle entering the intersection, or a vehicle approaching another vehicle or a person can be grasped as a space. The imaging target space may be within a range included in the field of view at the time of imaging, or may include a space within a range other than the range included in the field of view.

When acquiring related information, the input processing unit 14 may specify related information from operation information input from an operation input unit connected thereto. The operation input unit includes a member that accepts an operation from a user and generates operation information according to the accepted operation (for example, a touch sensor, a mouse, or a keyboard). At this time, the input processing unit 14 may output image data to a display unit (for example, a display) that can be connected thereto, and may display an image based on the image data. The input processing unit 14 may receive input of related information from another device. Moreover, the input processing unit 14 may determine related information by performing predetermined image processing on acquired image data. Image recognition processing may be applied as this image processing.

The first identification unit 32*b* receives input of image data and the above related information associated (linked) therewith from the input processing unit 14. The first identification unit 32*b* uses the first machine learning model to determine the conditional reliability (confidence) conditional on the event indicated by the related information of the first image feature from the image indicated by the image data. The first identification unit 32*b* outputs the determined conditional reliability of the first image feature to the model learning unit 36*b*.

The second identification unit 34*b* receives input of reconstructed image data and the related information from the reconstruction unit 224. The second identification unit 34*b* uses the fourth machine learning model to determine the conditional reliability conditional on the event indicated by the related information of the second image feature from the reconstructed image indicated by the reconstructed image data. The second identification unit 34*b* outputs the determined conditional reliability of the second image feature to the model learning unit 36*b*. It should be noted that, also in the present exemplary embodiment, the fourth machine learning model is the same as the first machine learning model, and respective parameter sets are common.

The model learning unit 36*b* includes the data amount calculation unit 362, the recognition rate calculation unit 364, and a parameter update unit 366*b*.

As with the parameter update unit 366*a*, the parameter update unit 366*b* updates respective parameter sets for the second machine learning model and the third machine learning model so as to at least further reduce the combined loss function obtained by combining the first loss function and the second loss function, and updates the parameter set for the first machine learning model so as to further increase the combined loss function. The parameter update unit 366*b* sets the updated parameter set for the first machine learning model to the first identification unit 32*b* and the second identification unit 34*b*, respectively. The parameter update unit 366*b* sets the updated parameter set for the third machine learning model and the updated parameter set for the fourth machine learning model to the compression unit 124 and the reconstruction unit 224, respectively.

However, the first loss function according to the present exemplary embodiment is a component that indicates the level of change in the conditional reliability of the second image feature input from the second identification unit 34*a*, from the conditional reliability of the first image feature input from the first identification unit 32*b*. For example, as shown in Equation (4), the first loss function $L_1$ quantitatively indicates the level of divergence between the distribution of the conditional reliability $D(x|s)$ conditional on an event s of the first image feature and the distribution of the conditional reliability $D(G(x)|s)$ conditional on the event s of the second image feature.

[Equation 4]

$$L_1 = f_1(D(x|s)) + f_2(D(G(x)|s)) \tag{4}$$

As has been described above, in the present exemplary embodiment, the first loss function indicates the level of change in the conditional reliability of the second image feature identified on condition of the event from the conditional reliability of the first image feature identified on condition of a predetermined event pertaining to an original image. The first loss function is used for determining the parameter set for the first machine learning model that is common with the parameter set for the fourth machine learning model so as to at least further increase the combined loss function obtained by combining the second loss function.

According to such a configuration, reconstructed data representing a reconstructed image is generated such that the reliability of the image feature identified in the feature region is maintained to the greatest possible extent on condition of a predetermined event. As a result, the visual quality of the reconstructed image and the recognition rate of image recognition can both be improved on condition of a predetermined event. Also, as the compression unit 124 and the reconstruction unit 224, the same units as those in the information processing system 1*a* according to the first exemplary embodiment can be applied as they are. Therefore, implementation of the present exemplary embodiment does not involve an increase in computational resources. Note that the information processing system 1*b* may also be realized as an information processing device that includes the model learning unit 36*b*.

Third Exemplary Embodiment

Next, a third exemplary embodiment will be described below. The following description mainly focuses on differences from the exemplary embodiments described above. Configurations and processes common to those of the above exemplary embodiments are denoted by common reference signs unless otherwise specified, and descriptions thereof are incorporated.

Figure 7:
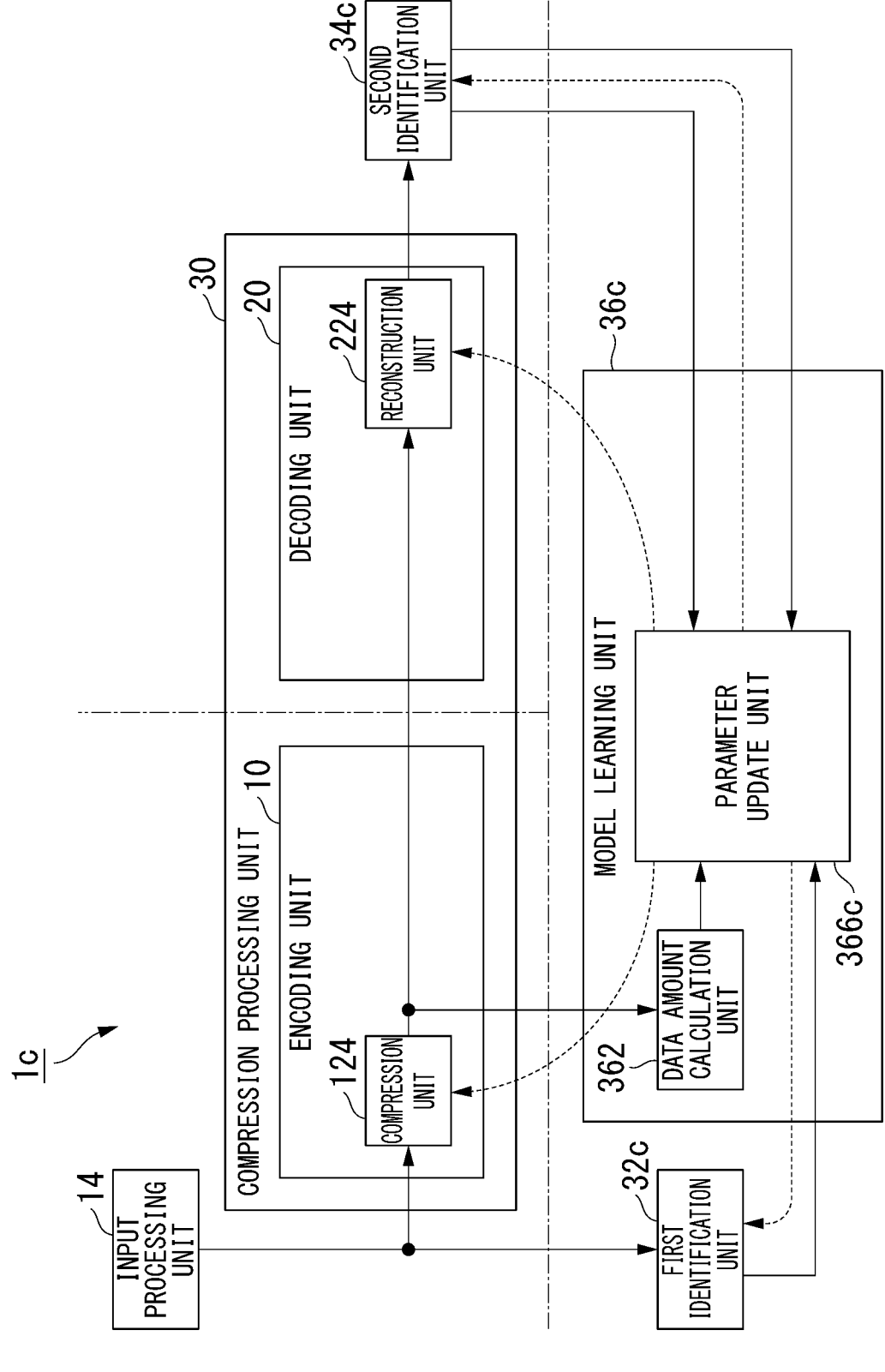
FIG. 7 A schematic block diagram showing a configuration example of an information processing system according to a third exemplary embodiment.

FIG. 7 is a schematic block diagram showing a configuration example of an information processing system 1*c* according to the present exemplary embodiment. The information processing system 1*c* roughly includes the input processing unit 14, the compression processing unit 30, a first identification unit 32*c*, a second identification unit 34*c*, and a model learning unit 36*c*. The specific configurations of these units are as follows.

In the information processing system 1*c*, the image recognition unit 42 is omitted because the second identification unit 34*c* implements image recognition processing. The reconstruction unit 224 outputs generated reconstructed image data to the second identification unit 34*c*. The parameter set for the first machine learning model used by the first identification unit 32*c* are common with the parameter set for the fourth machine learning model used by the second identification unit 34*c*. Therefore, the first identification unit 32*c* implements the same processing as the second identification unit 34*c*.

The input processing unit 14 outputs acquired image data to the compression unit 124 and the first identification unit 32*c*.

From the image indicated by the image data input from the input processing unit 14, the first identification unit 32*c* determines the reliability of a first characteristic in a feature region represented by the image data input from the input processing unit 14, by using the first machine learning model. The first identification unit 32c outputs the reliability of the first characteristic to the model learning unit 36c.

From the reconstructed image represented by the reconstructed image data input from the reconstruction unit 224, the second identification unit 34c determines the reliability of a second characteristic in the feature region indicated by the reconstructed image data input from the reconstruction unit 224, by using the fourth machine learning model. The second identification unit 34c outputs the reliability of the second characteristic to the model learning unit 36c.

However, the first identification unit 32c and the second identification unit 34c each determine the reliability of the characteristics of the subject, which are the same recognition results as those of the image recognition unit 42, as the first characteristic and the second characteristic respectively. Moreover, there may be multiple subject characteristics that can be recognized by each of the first identification unit 32c and the second identification unit 34c. Effectively, the first identification unit 32c and the second identification unit 34c each implement image recognition processing. The reliability of the first image feature and the reliability of the second image feature can each be an index of the recognition rate. In the case where the second characteristic of multiple subjects can be identified, the second identification unit 34c determines the second characteristic that gives the maximum value among the respective reliabilities, as the recognition result. The second identification unit 34c outputs recognition information indicating the recognition result to a predetermined output destination.

The model learning unit 36c includes the data amount calculation unit 362 and a parameter update unit 366c.

As with the parameter update units 366a and 366b, the parameter update unit 366c updates respective parameter sets for the second machine learning model and the third machine learning model so as to further reduce the combined loss function as the entire image data related to the processing, and updates the parameter set for the first machine learning model so as to further increase the combined loss function.

However, in place of the first loss function and the second loss function, the combined loss function according to the present exemplary embodiment includes a component of a reliability loss function (confidence loss function) that indicates the level of reduction in the reliability of the second characteristic input from the second identification unit 34c, from the reliability of the first characteristic input from the first identification unit 32c. For example, the reliability loss function $\Delta L$ is defined using Equation (5).

[Equation 5]

$$\Delta L = D(x) - D(G(x)) \tag{5}$$

Equation (5) indicates that the difference between the reliability $D(x)$ of the first characteristic and the reliability $D(G(x))$ of the second characteristic is the reliability loss $\Delta L$. Comparing with the first loss function $L_1$ in Equation (1), the reliability loss function $\Delta L$ shown in Equation (5) can also be regarded as a case where the functions $f_1(y)=y$, $f_2(y)=-y$. This reliability loss function $\Delta L$ is also called Wasserstein GAN loss (W-GAN) or W-GAN penalty. By using the reliability loss function $\Delta L$, it is possible to stably determine the parameter set for the first machine learning model, and thus the parameter sets for the second machine learning model and the third machine learning model.

Note that, in the case where there are multiple subject characteristics that can be recognized, the first identification unit 32c and the second identification unit 34c should calculate the reliability for each of the multiple characteristics. Then, for the reliability of each of the multiple characteristics, the parameter update unit 366c should use the reliability loss $\Delta L$ defined by means of simple average or weighted average of the contribution found from the right-hand side of Equation (5).

The combined loss function L according to the present exemplary embodiment may be defined by combining the reliability loss function $\Delta L$ and the third loss function $L_3$ as shown in Equation (6). However, in the example shown in Equation (6), the weight coefficient for the reliability loss function $\Delta L$ is 1. By including the third loss function $L_3$ indicating the data size of compressed data as a component of the combined loss function L, an increase in data size can be suppressed.

[Equation 6]

$$L = \Delta L + \lambda L_3 \tag{6}$$

Instead of the difference between the reliability input from the first identification unit 32c and the reliability input from the second identification unit 34c, the reliability loss function $\Delta L$ may be the difference between the recognition rate of the first characteristic recognized by the first identification unit 32c and the recognition rate of the second characteristic recognized by the second identification unit 34c. In such a case, the parameter update unit 366c may determines the error rate for each of the first characteristic and the second characteristic as the recognition results, using the same method as the recognition rate calculation unit 364, and subtract the error rate from 1 for each of them to thereby determine the recognition rate.

Figure 8:
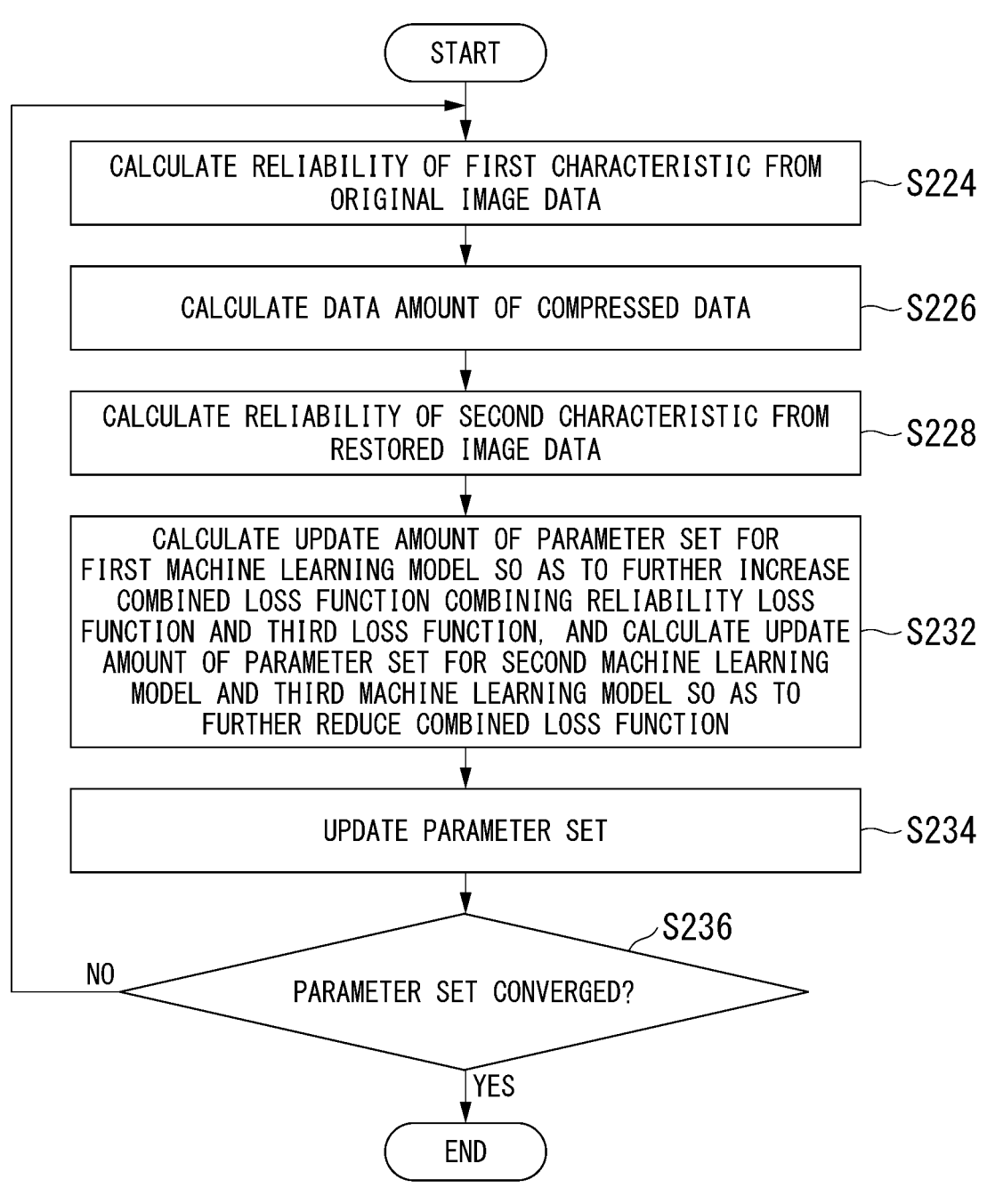
FIG. 8 A flowchart showing an example of model learning processing according to the third exemplary embodiment.

Next, an example of model learning processing according to the present exemplary embodiment will be described. FIG. 8 is a flowchart showing an example of the model learning processing according to the present exemplary embodiment.

(Step S224) The first identification unit 32c calculates the reliability of the first characteristic identified from the image indicated by image data input from the input processing unit 14, by using the first machine learning model.

(Step S226) The data amount calculation unit 362 calculates the data amount of compressed data acquired from the compression unit 124.

(Step S228) The second identification unit 34c calculates the reliability of the second characteristic identified from the reconstructed image indicated by the reconstructed image data acquired from the reconstruction unit 224, by using the fourth machine learning model.

(Step S232) The parameter update unit 366c calculates the update amount of the parameter set for the first machine learning model so as to further increase the combined loss function combining the reliability loss function and the third loss function, and calculates the update amount of the respective parameter sets for the second machine learning model and the third machine learning model so as to further reduce the combined loss function. The model parameters for the fourth machine learning model are in common with the parameter set for the first machine learning model. The reliability loss function is an index indicating the level of difference between the reliability of the first characteristic and the reliability of the second characteristic. The third loss function is an index indicating the data amount of compressed data.

(Step S234) The parameter update unit 366c updates the respective parameter sets for the first machine learning model to the fourth machine learning model, using the update amounts defined respectively.

(Step S236) The parameter update unit 366c determines whether or not the parameter sets have converged. If determined as having converged (Step S236: YES), the process of FIG. 8 ends. If determined as not having converged (Step S236: NO), the process returns to Step S224.

As has been described above, according to the present exemplary embodiment, the parameter set for the first machine learning model are defined so as to at least further increase the combined loss function, and the respective parameter sets for the second machine learning model and the third machine learning model are defined so as to further reduce the combined loss function. The parameter set for the first machine learning model are common with the parameter set for the fourth machine learning model. The first machine learning model is used for determining the reliability of a first characteristic identified from a feature region of an original image. The second machine learning model is used for generating compressed data with a further reduced data amount for the original image. The third machine learning model is used for generating a reconstructed image from the compressed data. The fourth machine learning model is used for determining the reliability of a second characteristic identified from a feature region of a reconstructed image. The combined loss function includes, as a component thereof, the reliability loss function that indicates the level of reduction in the reliability of the second characteristic, from the reliability of the first characteristic.

According to such a configuration, it is possible to obtain a reconstructed image in which the first characteristic recognized from a feature region of an original image can be recognized to the greatest possible extent. Moreover, parameter set learning is stabilized based on the difference between the reliability of the first characteristic and the reliability of the second characteristic. As a result, the visual quality of a reconstructed image and the recognition rate of image recognition can both be improved stably. Note that the information processing system 1c may also be realized as an information processing device that includes the model learning unit 36c.

Fourth Exemplary Embodiment

Next, a fourth exemplary embodiment will be described below. The following description mainly focuses on differences from the exemplary embodiments described above. Configurations and processes common to those of the above exemplary embodiments are denoted by common reference signs unless otherwise specified, and descriptions thereof are incorporated.

Figure 9:
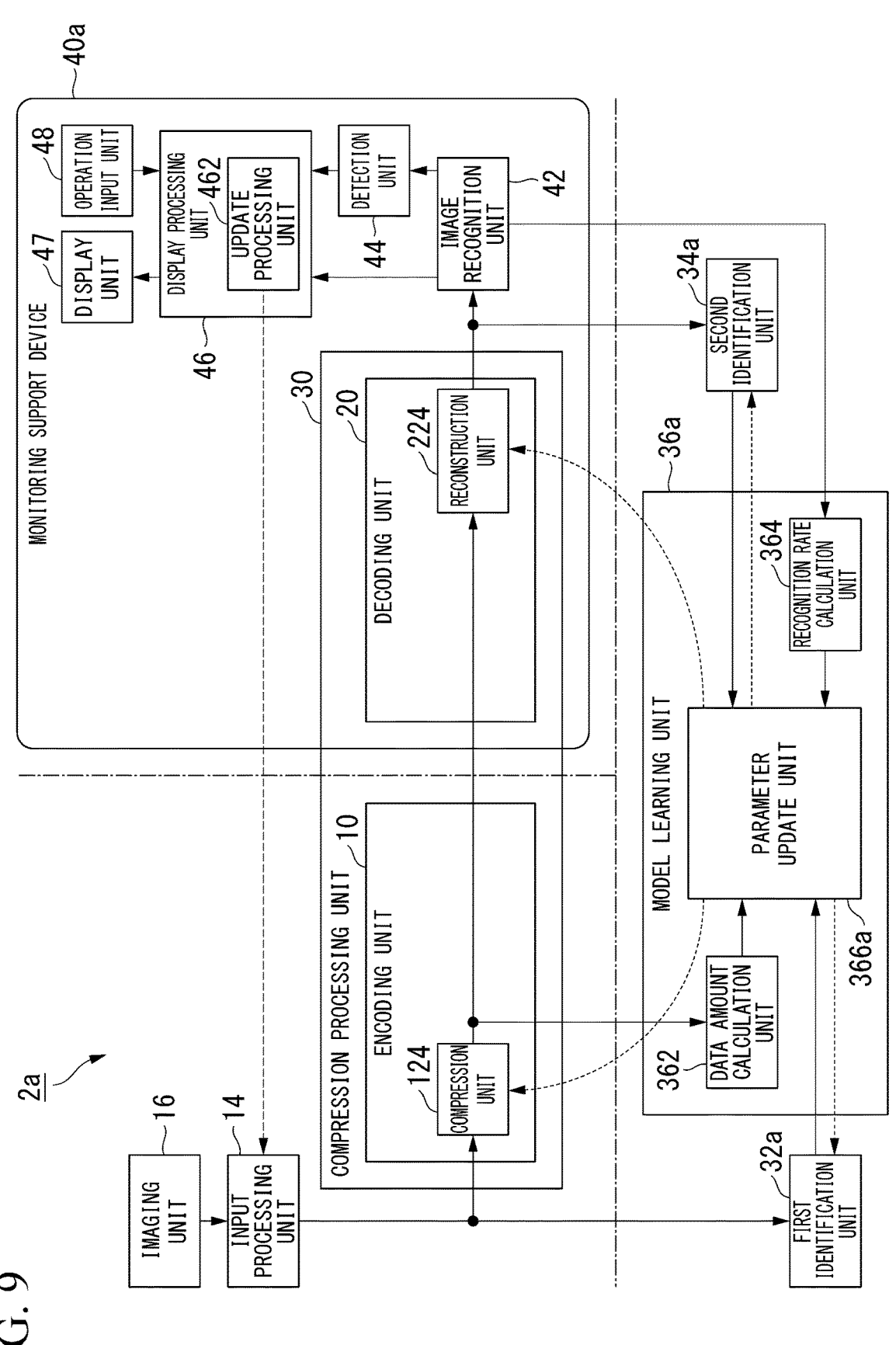
FIG. 9 A schematic block diagram showing a configuration example of an information processing system according to a fourth exemplary embodiment.

Next, a configuration example of an information processing system according to the present exemplary embodiment will be described. FIG. 9 is a schematic block diagram showing a configuration example of an information processing system 2a according to the present exemplary embodiment. The information processing system 2a shown as an example in FIG. 9 is an example of application to a remote monitoring system. Examples of a monitoring target include traffic conditions on the road. The information processing system 2a differs from the information processing system 1a in that it further includes an imaging unit 16 and a monitoring support device 40a including the image recognition unit 42. The monitoring support device 40a includes a detection unit 44, a display processing unit 46, a display unit 47, and an operation input unit 48, in addition to the decoding unit 20.

The imaging unit 16 captures an image within a field of view including a predetermined monitoring target region, and outputs image data representing the captured image to the input processing unit 14. The imaging unit 16 is, for example, a digital camera. In the example shown in FIG. 9, the input processing unit 14 does not include the imaging unit 16 and is configured separately from the imaging unit 16.

The image recognition unit 42 outputs recognition information obtained by performing image recognition processing to output destinations at the time, the output destinations being the detection unit 44 and the second identification unit 34a. The image recognition unit 42 outputs to the display processing unit 46 the reconstructed image data input thereto.

Among the recognition information input from the image recognition unit 42, the detection unit 44 detects (filters) recognition information that indicates a predetermined event (for example, an approach to another vehicle, an object, or a pedestrian, traffic congestion on the road, etc.) of which the user (for example, administrator) is notified. The detection unit 44 may reject recognition information that indicates other events. The detection unit 44 outputs the detected recognition information to the display processing unit 46.

The display unit 47 displays a display screen based on the display screen data input from the display processing unit 46. The display unit 47 is, for example, a display.

The operation input unit 48 accepts a user operation and outputs operation information according to the accepted operation to the display processing unit 46. The operation input unit 48 may include, for example, dedicated members such as buttons and knobs, or may include general-purpose members such as a touch sensor, a mouse, and a keyboard.

The display processing unit 46 constitutes a user interface together with the display unit 47 and the operation input unit 48. The display processing unit 46 primarily performs processing for causing the display unit 47 to display within a predetermined display frame a display screen including a part or all of the reconstructed image represented by the reconstructed image data input from the image recognition unit 42. The display processing unit 46 controls the display function of the display screen according to the operation information input from the operation input unit 48. The display processing unit 46 includes an update processing unit 462.

The update processing unit 462 outputs to the display unit 47 display screen data indicating a display screen including the reconstructed image. The display unit 47 displays a display screen indicated by the display screen data input from the update processing unit 462. Based on region designation information related to the display region of the reconstructed image input from the operation input unit 48, the update processing unit 462 updates the feature region. The updated feature region can be set according to the operation of the user who viewing the reconstructed image included in the display screen. As region designation information, the update processing unit 462 acquires a region that is a partial region of the original image or the reconstructed image and that is designated by operation information from the operation input unit, as a new feature region.

The update processing unit 462 may have, for example, a dedicated function for explicitly specifying a feature region from a reconstructed image according to operation information, or a function for implicitly specifying a feature region.

When implicitly specifying a feature region, in the function of adjusting the display size or display position of the reconstructed image, after an operation that assumes user's interest in a particular region has been performed, the update processing unit 462 may estimate the region corresponding to the display frame of the display screen as a feature region if neither change of display size nor change of display position is instructed for a predetermined length of waiting time (for example, 1 to 3 seconds) or longer. Examples of operation that assumes user's interest include change of display position, enlargement, or a combination thereof. The update processing unit 462 outputs feature region information indicating information of a new feature region to the parameter update unit 366*a*.

The update processing unit 462 may further output recognition information acquired from the image recognition unit 42 to the display unit 47, and acquire subject information related to the characteristics of the subject in the feature region. Here, the characteristic of the subject can be set according to the operation of the user who viewing the reconstructed image. From the operation information input from the operation input unit, the update processing unit 462 acquires subject information indicating characteristics of the subject in the feature region. The update processing unit 462 outputs the acquired subject information to the parameter update unit 366*a*.

For the reconstructed image, the parameter update unit 366*a* updates the feature region identified at the time to the feature region indicated by the feature region information acquired from the update processing unit 462. For the updated feature region, the parameter update unit 366*a* uses the above method to update the parameter set for the first machine learning model so as to further increase the combined loss function, and update the respective parameter sets for the second machine learning model and the third machine learning model so as to further increase the combined loss function.

For the original image, in the updated feature region, parameter update unit 366*a* may set the reliability target value to 1 as true information for a known first image feature included in the original image, and set the reliability target value to 0 for other image features not included in the original image. The parameter update unit 366*a* may update parameter sets for each individual machine learning model, so that the reliability estimated value for the first image feature that is estimated for the reconstructed image and the reliability estimated values for other image features each approximate their respective target values.

In the case where subject information is acquired from the update processing unit 462, the parameter update unit 366*a* sets the characteristic of the subject indicated in the subject information as the first image feature. The parameter update unit 366*a* may replace this setting with the known first image feature and update the parameter set for each individual machine learning model.

The information processing system 2*a* shown in FIG. 9 takes a remote monitoring system based on the information processing system 1*a* as an example, however, a remote monitoring system based on the information processing system 1*b* may also be configured as an information processing system 2*b* (not shown in the drawings) in a manner similar to that of the information processing system 1*a*. As with the parameter update unit 366*a*, the parameter update unit 366*b* can update the respective parameter sets for the first machine learning model to the fourth machine learning model. However, as the first loss function, which is a component of the combined loss function, the one used in the information processing system 1*b* is applied.

Figure 10:
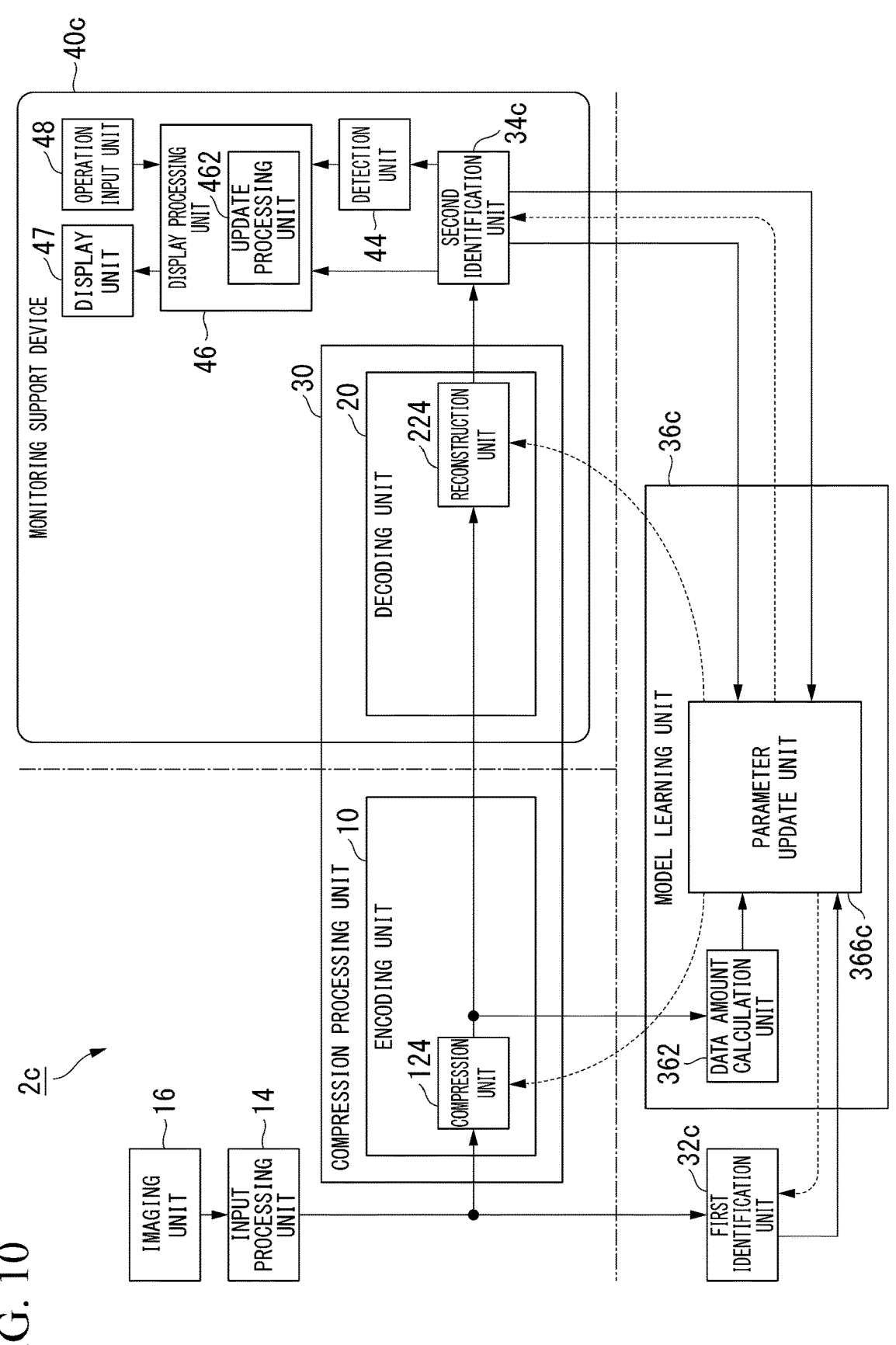
FIG. 10 A schematic block diagram showing another configuration example of the information processing system according to the fourth exemplary embodiment.

Next, another configuration example of the information processing system according to the present exemplary embodiment will be described. FIG. 10 is a schematic block diagram showing a configuration example of an information processing system 2*c* according to the present exemplary embodiment. The information processing system 2*c* shown as an example in FIG. 10 further includes the detection unit 44, the display processing unit 46, the display unit 47, and the operation input unit 48 as additional units to the information processing system 1*c*. A monitoring support device 40*c* provided in the information processing system 2*c* includes the decoding unit 20, the second identification unit 34*c*, the detection unit 44, the display processing unit 46, the display unit 47, and the operation input unit 48. For the description of the detection unit 44, the display processing unit 46, the display unit 47, and the operation input unit 48, the description of the information processing system 2*a* is used.

However, in this configuration example, in place of the image recognition unit 42, the second identification unit 34*c* outputs recognition information and reconstructed image data to the detection unit 44 and the display processing unit 46, respectively.

The destination of feature region information and subject information output from the update processing unit 462 is the parameter update unit 366*c*.

In the case where feature region information is acquired from the update processing unit 462, for the reconstructed image, the parameter update unit 366*c* updates the feature region identified at the time to the feature region indicated by the acquired feature region information.

In the case where subject information is acquired from the update processing unit 462, the parameter update unit 366*c* sets the characteristic of the subject indicated in the acquired subject information as a first characteristic. The parameter update unit 366*c* can also update the parameter set for each individual machine learning model, using the updated setting.

Although the information processing systems 2*a* to 2*c* are applied as a remote monitoring system as examples, they may be applied to different uses, and part of the configuration thereof may be omitted, added, or changed depending on the use. Examples of different applications include measurement systems, control systems for plants, monitoring, and the like.

Moreover, in model learning, true information is not limited to information determined by humans, and information determined using an instrument having more abundant computational resources than the component devices in the above configuration examples may be used, because such information is generally expected to be truer than information determined by element devices.

Furthermore, the touch sensor forming the operation input unit 48 may be integrated with the display forming the display unit 47 to form a single touch panel. One or both of the display unit 47 and the operation input unit 48 do not necessarily have to be provided as part of the monitoring support devices 40*a* to 40*c* as long as they are connected to the display processing unit 46 in a manner that allows input and output of various data.

As has been described above, the present exemplary embodiment includes the update processing unit 462 that updates the feature region based on operation information regarding display of the reconstructed image.

As a result, a portion of interest to the user viewing the reconstructed image is designated as a feature region by means of an operation. Therefore, image recognition that emphasizes portions more suited to the user's interest is realized.

Also, the update processing unit 462 may determine the first image feature or the first characteristic in the feature region, based on operation information regarding the characteristic of the subject in the feature region of the reconstructed image. As a result, the first image feature or first characteristic expected by the user viewing the reconstructed image is designated by an operation. Therefore, the processing result that the user expects can be obtained by means of image recognition.

(Minimum Configuration)

Figure 11:
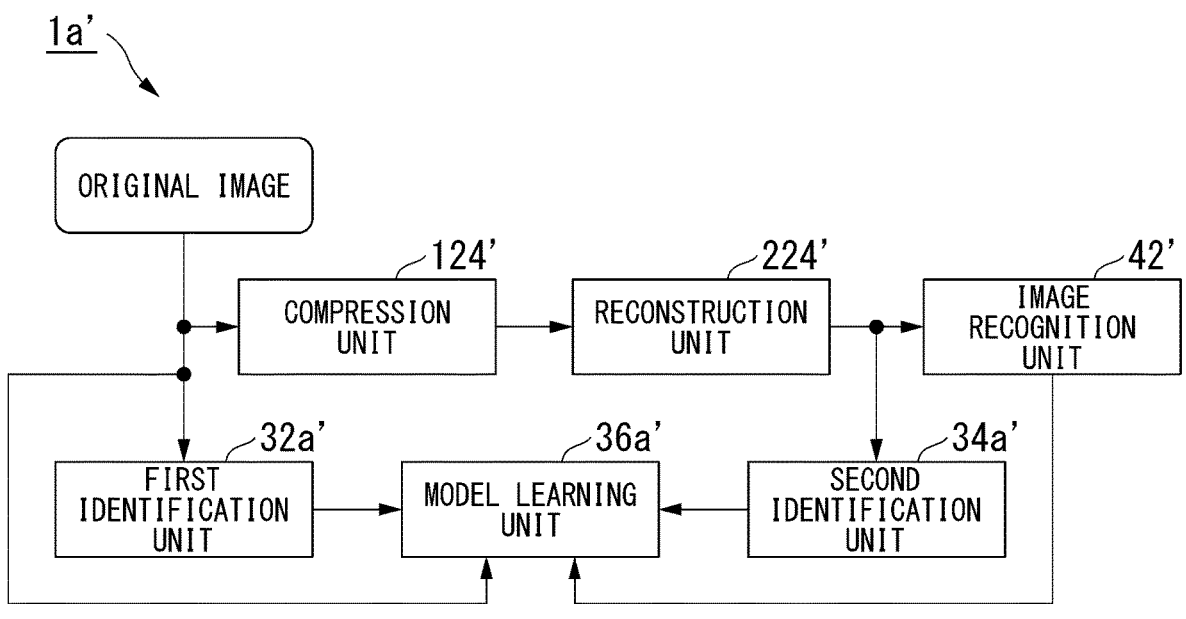
FIG. 11 A schematic block diagram showing a minimum configuration example of the information processing system.

Next, a minimum configuration of the above exemplary embodiment will be described. FIG. 11 is a schematic block diagram showing a minimum configuration example of an information processing system 1a' of the present application. The information processing system 1a' includes: a first identification unit 32a' that identifies a first image feature in a feature region of an original image, by using a first machine learning model for the original image; a compression unit 124' that generates compressed data with a reduced data amount, by using a second machine learning model for the original image; a reconstruction unit 224' that generates a reconstructed image of the original image from the compressed data, by using a third machine learning model; a second identification unit 34a' that identifies a second image feature in a feature region of the reconstructed image, by using a fourth machine learning model for the reconstructed image; an image recognition unit 4T that performs image recognition processing on the reconstructed image and determines a characteristic of a subject represented in the reconstructed image; and a model learning unit 36a' that treats a parameter set for the fourth machine learning model in common with that for the first machine learning model, that determines a parameter set for the first machine learning model so as to further increase a combined loss function obtained by combining: a first loss function indicating the level of change in the reliability of the second image feature, from the reliability of the first image feature; and a second loss function indicating the level of recognition error in the image recognition processing, and that determines respective parameter sets for the second machine learning model and the third machine learning model so as to further reduce the combined loss function.

Figure 12:
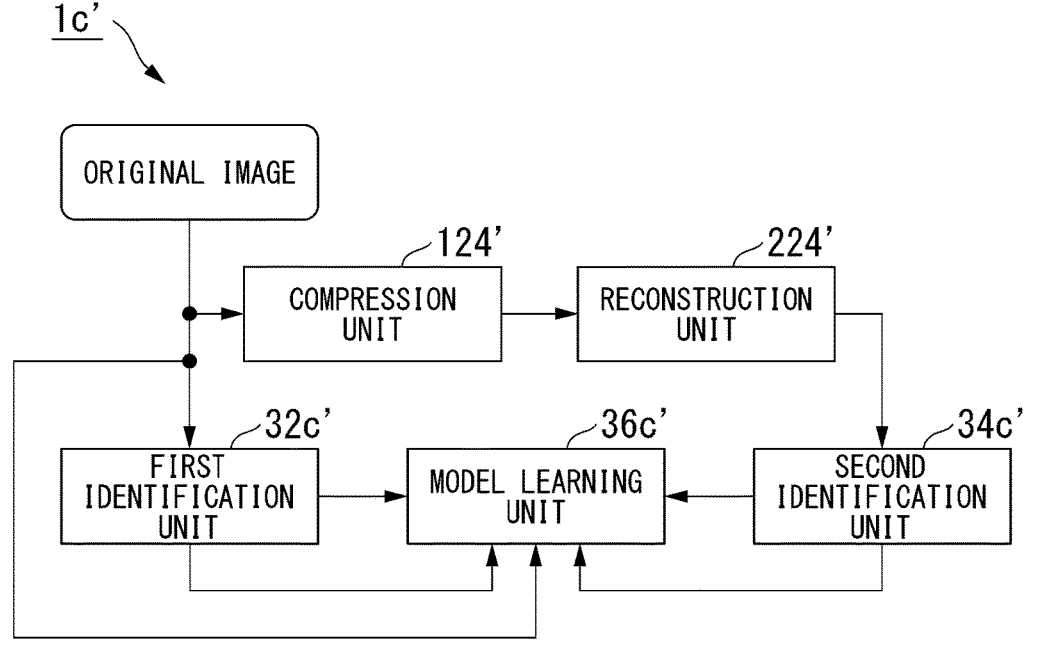
FIG. 12 A schematic block diagram showing another minimum configuration example of the information processing system.

FIG. 12 is a schematic block diagram showing a minimum configuration example of an information processing system 1c' of the present application. The information processing system 1c' includes: a first identification unit 32c' that performs image recognition processing on an original image, by using a first machine learning model, and determines a first characteristic that is a characteristic of a subject in a feature region; a compression unit 124' that generates compressed data with a reduced data amount, by using a second machine learning model for the original image; a reconstruction unit 224' that generates a reconstructed image of the original image from the compressed data, by using a third machine learning model; a second identification unit 34c' that performs image recognition processing on the reconstructed image, by using a fourth machine learning model, and determines a second characteristic that is a characteristic of the subject in the feature region of the reconstructed image; and a model learning unit 36c' that treats a parameter set for the fourth machine learning model in common with that for the third machine learning model, that determines a parameter set for the first machine learning model so as to further increase a combined loss function indicating the level of reduction in the reliability of the second characteristic, from the reliability of the first characteristic, and that determines respective parameter sets for the second machine learning model and the third machine learning model so as to further reduce the combined loss function.

Figure 13:
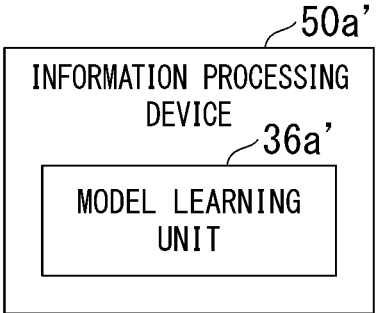
FIG. 13 A schematic block diagram showing a minimum configuration example of an information processing device.

FIG. 13 is a schematic block diagram showing a minimum configuration example of an information processing device 50a' of the present application. The information processing device 50a' includes a model learning unit 36a' that determines a first machine learning model so as to further increase a combined loss function obtained by combining: a first loss function indicating the level of change in the reliability of a second image feature in a feature region of the reconstructed image of the original image, the feature region being identified by using a fourth machine learning model on the reconstructed image, from the reliability of a first image feature in a feature region of the original image identified by using the first machine learning model on the original image; and a second loss function indicating the level of recognition error in image recognition processing of the reconstructed image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

Figure 14:
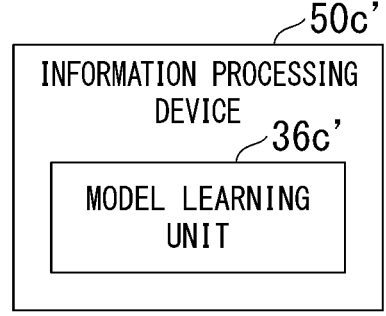
FIG. 14 A schematic block diagram showing another minimum configuration example of the information processing device.

FIG. 14 is a schematic block diagram showing a minimum configuration example of an information processing device 50c' of the present application. The information processing device 50c' includes a model learning unit 36c' that determines a first machine learning model so as to further increase a combined loss function indicating the level of reduction in the reliability of a second characteristic that is a characteristic of a subject determined in a feature region of a reconstructed image by performing image recognition processing, by using a fourth machine learning model for the reconstructed image of an original image, from the reliability of a first characteristic that is a characteristic of the subject determined in a feature region of the original image by performing image recognition processing, by using the first machine learning model for the original image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

Note that each of the above devices, such as edge devices, server devices, information processing devices, and monitoring support devices, may include a computer system therein. The computer system includes one or more processors such as a CPU (Central Processing Unit). The process of each processing described above is stored in a computer-readable recording medium in the form of a program for each instrument or device, and the processing is performed by a computer reading and executing the program. The computer system includes software such as an OS (operating system), device drivers and utility programs, and hardware such as peripheral devices. Moreover, the computer-readable recording medium refers to a portable medium such as a magnetic optical disk, a ROM (Read Only Memory) and a semiconductor memory, or a storage device such as a hard disk built in a computer system. Furthermore, computer-readable recording media refer to those that dynamically store programs for a short period of time, such as communication lines used for transmitting programs using networks such as the Internet and communication lines such as telephone lines. It may also include a volatile memory inside a computer system serving as a server or a client, which holds programs for a certain period of time. The program mentioned above may be a program for implementing a part of the functions described above, and may be a so-called difference file (difference program) capable of implementing the functions described above in combination with a program already recorded in a computer system.

Also, part or all of the instruments or devices in the exemplary embodiments described above may be implemented as an integrated circuit such as LSI (Large Scale Integration). Each functional block of each instrument or device may be individually made into a processor, or may be partially or entirely integrated into a processor. Also, the method of circuit integration is not limited to LSI, but may be realized by a dedicated circuit or a general-purpose processor. Furthermore, when an integrated circuit technology that replaces LSI appears due to the advancement of semiconductor technology, an integrated circuit based on this technology may be used.

The above exemplary embodiments may be implemented as described below.

(Supplementary Note 1) Included are: a first identification device that identifies a first image feature in a feature region of an original image, by using a first machine learning model for the original image; a compression device that generates compressed data with a reduced data amount, by using a second machine learning model for the original image; a reconstruction device that generates a reconstructed image of the original image from the compressed data, by using a third machine learning model; a second identification device that identifies a second image feature in a feature region of the reconstructed image, by using a fourth machine learning model for the reconstructed image; an image recognition device that performs image recognition processing on the reconstructed image and determines a characteristic of a subject represented in the reconstructed image; and a model learning device that treats a parameter set for the fourth machine learning model in common with that for the first machine learning model, that determines a parameter set for the first machine learning model so as to further increase a combined loss function obtained by combining: a first loss function indicating the level of change in the reliability of the second image feature, from the reliability of the first image feature; and a second loss function indicating the level of recognition error in the image recognition processing, and that determines respective parameter sets for the second machine learning model and the third machine learning model so as to further reduce the combined loss function.

(Supplementary Note 2) The information processing system according to supplementary note 1, wherein from the reliability of the first image feature identified on condition of a predetermined event pertaining to the original image, the first loss function indicates the level of change in the reliability of the second image feature identified on condition of the event.

(Supplementary Note 3) An information processing system including: a first identification device that performs image recognition processing on an original image, by using a first machine learning model, and determines a first characteristic that is a characteristic of a subject in a feature region; a compression device that generates compressed data with a further reduced data amount, by using a second machine learning model for the original image; a reconstruction device that generates a reconstructed image of the original image from the compressed data, by using a third machine learning model; a second identification device that performs image recognition processing on the reconstructed image, by using a fourth machine learning model, and determines a second characteristic that is a characteristic of the subject in the feature region of the reconstructed image; and a model learning device that treats a parameter set for the fourth machine learning model in common with that for the third machine learning model, that determines a parameter set for the first machine learning model so as to further increase a combined loss function indicating the level of reduction in the reliability of the second characteristic, from the reliability of the first characteristic, and that determines respective parameter sets for the second machine learning model and the third machine learning model so as to further reduce the combined loss function.

(Supplementary Note 4) The information processing system according to any one of supplementary notes 1 to 3, wherein the model learning device determines the first machine learning model, the second machine learning model, and the third machine learning model, based on the combined loss function obtained by further combining a third loss function indicating the size of the data amount of the compressed data.

(Supplementary Note 5) The information processing system according to any one of supplementary notes 1 to 4, further comprising an update processing device that updates the feature region based on operation information regarding display of the reconstructed image.

(Supplementary Note 6) The information processing system according to supplementary note 5, wherein the update processing device determines a first image feature or a first characteristic in the feature region, based on operation information regarding a characteristic of a subject in the feature region of the reconstructed image.

(Supplementary Note 7) An information processing method in an information processing system, the method including: a first step of identifying a first image feature in a feature region of an original image, by using a first machine learning model for the original image; a second step of generating compressed data with a further reduced data amount, by using a second machine learning model for the original image; a third step of generating a reconstructed image of the original image from the compressed data, by using a third machine learning model; a fourth step of identifying a second image feature in a feature region of the reconstructed image, by using a fourth machine learning model for the reconstructed image; a step of performing image recognition processing on the reconstructed image and determining a characteristic of a subject represented in the reconstructed image; and a fifth step of treating a parameter set for the fourth machine learning model in common with that for the first machine learning model, determining a parameter set for the first machine learning model so as to further increase a combined loss function obtained by combining: a first loss function indicating the level of change in the reliability of the second image feature, from the reliability of the first image feature; and a second loss function indicating the level of recognition error in the image recognition processing, and determining respective parameter sets for the second machine learning model and the third machine learning model so as to further reduce the combined loss function.

(Supplementary Note 8) An information processing method in an information processing system, the method including: a first step of performing image recognition processing on an original image, by using a first machine learning model, and determining a first characteristic that is a characteristic of a subject in a feature region; a second step of generating compressed data with a further compressed information amount, by using a second machine learning model for the original image; a third step of generating a reconstructed image of the original image from the compressed data, by using a third machine learning model; a fourth step of performing image recognition processing on the reconstructed image, by using a fourth machine learning model, and determining a second characteristic that is a characteristic of the subject in the feature region of the reconstructed image; and a fifth step of treating a parameter set for the fourth machine learning model in common with that for the third machine learning model, determining a parameter set for the first machine learning model so as to further increase a combined loss function indicating the level of reduction in the reliability of the second characteristic, from the reliability of the first characteristic, and determining respective parameter sets for the second machine learning model and the third machine learning model so as to further reduce the combined loss function.

(Supplementary Note 9) An information processing device including a model learning device: that determines a first machine learning model so as to further increase a combined loss function obtained by combining: a first loss function indicating the level of change in the reliability of a second image feature in a feature region of the reconstructed image of the original image, the feature region being identified by using a fourth machine learning model on the reconstructed image, from the reliability of a first image feature in a feature region of the original image identified by using the first machine learning model on the original image; and a second loss function indicating the level of recognition error in image recognition processing of the reconstructed image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

(Supplementary Note 10) An information processing device including a model learning device: that determines a first machine learning model so as to further increase a combined loss function indicating the level of reduction in the reliability of a second characteristic that is a characteristic of a subject determined in a feature region of a reconstructed image by performing image recognition processing, by using a fourth machine learning model for the reconstructed image of an original image, from the reliability of a first characteristic that is a characteristic of the subject determined in a feature region of the original image by performing image recognition processing, by using the first machine learning model for the original image; that determines, so as to further reduce the combined loss function, respective parameter sets for a second machine learning model used in the generation of compressed data, in which the amount of data is reduced compared to the original image, and a third machine learning model used in the generation of the reconstructed image from the compressed data; and that determines a parameter set for the fourth machine learning model in common with that for the first machine learning model.

(Supplementary Note 11) A storage medium having stored therein a program causing a computer to function as the information processing device according to supplementary note 9 or 10.

Although preferred embodiments of the present invention have been described above, the present invention is not limited to these embodiments and modified examples thereof. Additions, omissions, substitutions of and other changes in the configurations are possible without departing from the gist of the present invention.

Furthermore, the invention is not limited by the foregoing description, but only by the appended claims.

INDUSTRIAL APPLICABILITY

According to the information processing system, the information processing device, the information processing method, and the storage medium of the exemplary aspects described above, it is possible to obtain a reconstructed image in which image features in a feature region of an original image, and recognition rate of the image recognition processing are both maintained to the greatest possible extent. As a result, the visual quality of a reconstructed image and the recognition rate of image recognition can be improved.

REFERENCE SIGNS LIST 1a, 1b, 1c, 1a', 1c', 2a, 2b, 2c Information processing system
10 Encoding unit (encoding device)
14 Input processing unit (input processing device)
16 Imaging unit (imaging device)
20 Decoding unit (decoding device)
30 Compression processing unit (compression processing device)
32a, 32b, 32c, 32a', 32c' First identification unit (first identification device)
34a, 34b, 34c, 34a', 34c' Second identification unit (second identification device)
36a, 36b, 36c, 36a', 36c' Model learning unit (model learning device)
40a, 40b, 40c Monitoring support device
42, 42 Image recognition unit (image recognition device)
44 Detection unit (detection device)
46 Display processing unit (display processing device)
47 Display unit (display device)
48 Operation input unit (operation input device)
50a', 50c' Information processing device
124, 124 Compression unit (compression device)
224, 224 Reconstruction unit (reconstruction device)
362 Data amount calculation unit (data amount calculation device)
364 Recognition rate calculation unit (recognition rate calculation device)
366a, 366b, 366c Parameter update unit (parameter update device)
462 Update processing unit (update processing device)
1242 Characteristic analysis unit (characteristic analysis device)

1244 First distribution estimation unit (first distribution estimation device)
1246 First sampling unit (first sampling device)
2242 Second distribution estimation unit (second distribution estimation device)
2244 Second sampling unit (second sampling device)
2246 Data generation unit (data generation device)

What is claimed is:
1. An information processing method in an information processing system, the information processing method comprising:
  identifying a first image feature in a feature region of an original image, by using a first machine learning model for the original image;
  generating compressed data with a further reduced data amount, by using a second machine learning model for the original image;
  generating a reconstructed image of the original image from the compressed data, by using a third machine learning model;
  identifying a second image feature in a feature region of the reconstructed image, by using a fourth machine learning model for the reconstructed image;
  performing image recognition processing on the reconstructed image;
  determining a characteristic of a subject represented in the reconstructed image; and
  treating a parameter set for the fourth machine learning model in common with that for the first machine learning model,
  determining a parameter set for the first machine learning model so as to further increase a combined loss function obtained by combining: a first loss function indicating a level of change in a reliability of the second image feature, from a reliability of the first image feature; and a second loss function indicating a level of recognition error in the image recognition processing, and
  determining respective parameter sets for the second machine learning model and the third machine learning model so as to further reduce the combined loss function.
2. An information processing device comprising:
  at least one memory configured to store instructions; and
  at least one processor configured to execute the instructions to:
  determine a first machine learning model so as to further increase a combined loss function obtained by combining: a first loss function indicating a level of change in a reliability of a second image feature in a feature region of a reconstructed image of an original image, the feature region being identified by using a fourth machine learning model on the reconstructed image, from a reliability of a first image feature in a feature region of the original image identified by using the first machine learning model on the original image; and a second loss function indicating a level of recognition error in image recognition processing of the reconstructed image;
  determine, so as to further reduce the combined loss function, respective parameter sets for a second machine learning model used in a generation of compressed data, in which an amount of data is reduced compared to the original image, and a third machine learning model used in a generation of the reconstructed image from the compressed data; and determine a parameter set for the fourth machine learning model in common with that for the first machine learning model.
3. A non-transitory storage medium having stored therein a program causing a computer to perform processes as the information processing device, the processes comprising:
  determining a first machine learning model so as to further increase a combined loss function obtained by combining: a first loss function indicating a level of change in a reliability of a second image feature in a feature region of a reconstructed image of an original image, the feature region being identified by using a fourth machine learning model on the reconstructed image, from a reliability of a first image feature in a feature region of the original image identified by using the first machine learning model on the original image; and a second loss function indicating a level of recognition error in image recognition processing of the reconstructed image;
  determining, so as to further reduce the combined loss function, respective parameter sets for a second machine learning model used in a generation of compressed data, in which an amount of data is reduced compared to the original image, and a third machine learning model used in a generation of the reconstructed image from the compressed data; and
  determining a parameter set for the fourth machine learning model in common with that for the first machine learning model.
4. The information processing device according to claim 2, wherein:
  from the reliability of the first image feature identified on condition of a predetermined event pertaining to the original image, the first loss function indicates the level of change in the reliability of the second image feature identified on condition of the event.
5. The information processing device according to claim 2, wherein
  the at least one processor is configured to execute the instructions to:
  determine the first machine learning model, the second machine learning model, and the third machine learning model, based on the combined loss function obtained by further combining a third loss function indicating a size of data amount of the compressed data.
6. The information processing device according to claim 2, wherein
  the at least one processor is further configured to execute the instructions to:
  update the feature region based on operation information regarding display of the reconstructed image.
7. The information processing device according to claim 6, wherein
  the at least one processor is configured to execute the instructions to:
  determine the first image feature or a first characteristic in the feature region, based on the operation information regarding a characteristic of a subject in the feature region of the reconstructed image.
8. The information processing method according to claim 1, wherein:
  from the reliability of the first image feature identified on condition of a predetermined event pertaining to the original image, the first loss function indicates the level of change in the reliability of the second image feature identified on condition of the event.

9. The information processing method according to claim 1, comprising:

determining the first machine learning model, the second machine learning model, and the third machine learning model, based on the combined loss function obtained by further combining a third loss function indicating a size of the data amount of the compressed data.

10. The information processing method according to claim 1, further comprising:

updating the feature region based on operation information regarding display of the reconstructed image.

11. The information processing method according to claim 10, wherein:

the updating includes determining the first image feature or a first characteristic in the feature region, based on the operation information regarding the characteristic of the subject in the feature region of the reconstructed image.

\* \* \* \* \*